(12) United States Patent
Lee et al.

(10) Patent No.: US 6,224,016 B1
(45) Date of Patent: May 1, 2001

(54) INTEGRATED FLEXIBLE SOLAR CELL MATERIAL AND METHOD OF PRODUCTION

(75) Inventors: Yee-Chun Lee, Cabin John; Sam M.-S. Chen, Silver Spring; Yu-Lun Lin, College Park; Brandon G. Mason, Pocomoke, all of MD (US); Elena A. Novakovskaia, Springfield, VA (US); Valentine R. Connell, Pasadena, MD (US)

(73) Assignee: Sky Station International, Inc.

( * ) Notice: Subject to any disclaimer, the term of this patent is extended or adjusted under 35 U.S.C. 154(b) by 0 days.

(21) Appl. No.: 08/994,948

(22) Filed: Dec. 19, 1997

(51) Int. Cl.$^7$ ................. B64B 1/02; H01L 25/00
(52) U.S. Cl. ................. 244/30; 244/126; 244/58; 244/59; 136/245; 136/291; 136/256
(58) Field of Search ................. 244/30, 173, 126, 244/59, 58; 136/245, 291, 292, 256, 251

(56) References Cited

U.S. PATENT DOCUMENTS

| | | |
|---|---|---|
| 3,974,989 | 8/1976 | Goodfellow . |
| 4,208,027 | 6/1980 | Pavlecka . |
| 4,364,532 | 12/1982 | Stark . |
| 4,609,770 | 9/1986 | Nishiura et al. . |
| 4,768,738 | 9/1988 | Weinert . |
| 4,888,061 | * 12/1989 | Wenz ................. 136/245 |
| 5,296,044 | * 3/1994 | Harvey et al. ................. 136/292 |
| 5,348,254 | 9/1994 | Nakada . |
| 5,419,781 | * 5/1995 | Hamakawa et al. ................. 136/245 |
| 5,427,629 | 6/1995 | Tanzilli et al. . |
| 5,478,402 | 12/1995 | Hanoka . |
| 5,500,055 | 3/1996 | Toyama et al. . |
| 5,518,205 | 5/1996 | Wurst et al. . |
| 5,533,693 | 7/1996 | Abildskov . |
| 5,584,940 | 12/1996 | Yoshida . |
| 5,626,686 | 5/1997 | Yoshida . |
| 5,665,175 | 9/1997 | Safir . |
| 5,678,783 | * 10/1997 | Wong ................. 244/30 |
| 5,810,284 | * 9/1998 | Hibbs et al. ................. 244/58 |

FOREIGN PATENT DOCUMENTS

| | | |
|---|---|---|
| 21 60 345 | 5/1973 | (DE) . |
| 3002828 | * 7/1981 | (DE) . |
| 33 17 309 | 11/1984 | (DE) . |
| 3331029 | * 3/1985 | (DE) . |
| 40 25 795 | 2/1992 | (DE) . |
| 42 04 962 | 8/1993 | (DE) . |
| 4415238 | * 11/1995 | (DE) . |
| 6-163964 | * 6/1994 | (JP) . |

OTHER PUBLICATIONS

Knaupp W. et al.: "*Solar Powered Airship—Challenge and Chance*" Proceedings Of The Photovoltaic Specialists Conference, Louisville, May 10–14, 1993 No. Conf. 23, May 10, 1993 1314–1319, XP000438014 Institute of Electrical And Electronics Engineers.

* cited by examiner

*Primary Examiner*—J. Woodrow Eldred
(74) *Attorney, Agent, or Firm*—Breneman & Georges

(57) ABSTRACT

A novel energy producing flexible material is provided particularly suited for high altitude and stratospheric applications. The flexible energy producing covering includes a flexible solar cell layer, a flexible substrate which preferably matches the shape and size of the airship gore as well and an electrically conductive conduit disposed in a flexible electrically non-conductive adhesive connecting the flexible solar cell substrate to the airship substrate. Preferably two electrically conductive conduits are provided between the substrate layer and the flexible solar cell layer with the electrically conductive conduits being insulated from one another by the non-conductive adhesive. The novel process provided by the invention for joining the airship substrate to the flexible solar cell substrate includes heat, pressure and the selection of substrate materials and in certain applications the use of a vacuum.

87 Claims, 17 Drawing Sheets

NOTES:
ALL DIMENSIONS IN MICRONS – TOTAL THICKNESS ABOUT 0.012 INCH.

OVERALL GORE LENGTH 100 ~200 METERS (300 ~ 650 FEET)

MAXIMUM GORE WIDTH 1~2 METERS (4-6 FEET) ...WIDTH LIMITED BY MAX ROLL WIDTH OF PLASTIC FILM

TOTAL AREA OF SOLAR CELLS ~ 10-20,000 SQUARE METERS

AVERAGE SOLAR CELL SIZE 15 x 30 CENTIMETERS

INTEGRATED FLEXIBLE SOLAR CELL MATERIAL AND METHOD OF PRODUCTION

BACKGROUND OF THE INVENTION

1. Field of the Invention

The invention pertains to a novel stratospheric vehicle, novel airship gore and energy producing covering for high altitude platforms and method of producing the novel flexible energy producing covering. More particularly the invention pertains to a three-dimensional flexible covering which incorporates flexible solar cells as part of the outer layer of a bonded flexible envelope for high altitude airships, dirigibles and other such stratospheric, near space and space vehicles. The novel flexible energy producing bonded covering is a lightweight thin film material, typically 300 to 400 microns thick and weighs about 300 to 600 grams per square meter.

The novel lightweight flexible energy producing material is particularly suited for aircraft, spacecraft and lighter-than-air vehicles such as dirigibles, blimps and balloons constructed to operate in the stratosphere, at the threshold of space and in space. The energy producing skin is capable of converting sunlight into electricity and operate at low and high voltages of 40 to 6,000 and preferably 100 to 600 volts while having a total skin thickness of a few hundred microns. The invention achieves its advantages by combining thin plastic film flexible solar cells with thin film and fabric airship materials to produce a lightweight, durable, energy producing flexible covering particularly suited for airship technology.

The construction and design of high altitude platforms and airships involve a series of considerations all of which require a consideration of weight. The greater the weight, the greater the volume of lift gas required which increase the amount of covering necessary to contain the lift gas which results in a further increase in weight. These increases in weight and volume also impose additional power requirements to maneuver the airship or to place a vehicle in space or at the threshold of space. As a result a lightweight high energy producing material breaks the volume weight power cycle and allows a stratospheric vehicle to operate at a higher altitude and in space and to more efficiently gather and utilize energy.

As used herein the term vehicle and high altitude platform includes airships and other vehicles that operate in the stratosphere, threshold of space and in space which require a lightweight, energy producing material to maintain a given altitude or orbit or require lightweight materials for launching into space.

The flexible solar cell energy producing cover is bonded to the substrate of the flexible airship envelope while electrical contacts are being made to a conductive conduit carried between layers which also becomes part of the structural strength of the novel flexible energy producing covering. In one embodiment of the invention a special electrically conductive fabric layer is employed allowing the fabric substrate to electrically conduct electrical current along the length of the airship through the warp of the fabric while adding structural strength to the novel energy producing material. In another embodiment of the invention the electrical conduit provided by the fabric warp is combined with a conductive conduit in the form of a metallic ribbon or electrically conductive fibers sandwiched and electrically insulated by a flexible non-conductive polymer bonding adhesive.

The airship substrate may also be gas impervious or slightly gas pervious depending upon the particular method of the invention selected for producing the novel flexible energy producing covering. In the preferred application of the invention the airship substrate is substantially gas impervious and the method of the invention provides for the joining of the flexible solar cell layer with a non-conductive adhesive under heat, pressure and a vacuum to prevent the presence of small air bubbles from being trapped in the adhesive layer and rupturing or interfering with the integrity of the system in stratospheric applications.

In applications where the airship substrate is slightly gas pervious the flexible solar cell layer can be joined with the airship substrate with a flexible polymer adhesive under heat and pressure without a vacuum since small air bubbles upon expansion in the stratosphere can migrate into and through the gas pervious airship substrate. In the preferred embodiment the laminating process is performed under heat, pressure and a vacuum to remove air and provide a novel flexible and resilient energy producing covering particularly suited to high altitude and space vehicles.

2. Description of Related Art Including Information Disclosed Under 37 C.F.R. 1.97 and 37 C.F.R. 1.98

The sun is an ideal power source for long duration (one year or longer) stratospheric airships because of the lack of moisture and thin air in the stratosphere. At approximately 20–50 kilometers (12–31 miles), sunlight is a very strong, predictable source of energy. The major reasons solar power has not been utilized on airships are traditional, rigid solar cells are heavy and difficult to incorporate onto an airship envelope and the added weight of the solar cell added to the weight of the covering limits the absolute altitude at which the airship can operate with a given amount of lift gas and engine power.

Rigid solar cells are heavy because they are made with a glass substrate which is one of the heavier materials available and are usually mounted on stiff panels to prevent them from being twisted and cracked since they are rarely more than a few microns (thousandth of an inch) thick. Rigid solar cell arrays have been calculated to produce only about half the power for the same mass than lighter flexible solar cell arrays produce. This is because flexible solar cell arrays are made from thin layers of amorphous silicon deposited onto plastic film. Not only are these materials lighter than crystalline silicon bonded to glass, but they are inherently flexible and do not require stiff panels to protect them from twisting and cracking. This invention does not pertain to mounting rigid solar cells to an airship but instead to mounting flexible solar cells to an airship. However the problems encountered in mounting rigid or flexible solar cells to an airship are similar.

One common problem to mounting solar cells to airships is weight and particularly the added weight of the special mounting devices and other items that are required to mount rigid solar cell arrays onto the thin, curved flexible skin of an airship. While flexible solar cells are lighter there remains the common problem of expandability which is comparable to attaching small mirrors or strips of plastic to a balloon and then adding wiring and electrical connector and hardware between the mirrors or strips of plastic. These resulting rigid panels have to be attached with special mounting devices and electrical connectors to compensate for the flexing and this increases the weight without increasing power output.

A further problem in addition to weight is that large panels of rigid solar cells or flexible solar cells mounted on the surface of the airship are much like adding flat windowpanes or adding a covering to a covering that increases the size, drag and power required of the propulsion system. Such flat windowpane panels or added covering increases drag and impairs maneuverability and requires more power to propel the airship. Reducing the size of the panels and mounting more of them on the airship surface like mosaic tile is impractical as it adds additional weight by virtue of the additional wiring and electrical connectors required to connect the panels to the airship skin. Examples of prior art applications of rigid solar cells in panels and arrays with supporting frames for carrying the rigid cells is illustrated by Stark U.S. Pat. No. 4,364,532 and the attachment of solar cells to the flexible envelope of an airship is illustrated in Nakada U.S. Pat. No. 5,348,254.

Nakada U.S. Pat. No. 5,348,254 provides a specially fabricated single semi-circular solar cell that appears to be attached to the flexible envelope of the airship. In practice such an attachment of a rigid solar cell to a flexible envelope for a long duration application would result in delamination or shattering the solar cell as a result of the repeated flexing of the flexible airship substrate envelope. In Stark U.S. Pat. No. 4,364,532 the panels appear to be placed on the outside of the airship and appear to be held by frames and not attached directly to the envelope. This arrangement prevents delamination and shattering of the solar cell but at the expense of the aerodynamic characteristics of the airship and at the possible expense of the integrity of the airship envelope at the interface between the rigid frame and the thin flexible airship skin.

Other prior art such as Wurst, et al. U.S. Pat. No. 5,518,205 utilize a rigid wing or support structure of limited expandability as a substrate for a solar cell array for a high altitude platform. In Wurst, et al. '205 the rigid solar cells are placed upon a rigid airfoil shaped wing which obviates the problem of having a three-dimensional flexible substrate which expands and contracts underneath a rigid solar cell. Wurst, et al. '205 like the other prior art does not incorporate the solar cells directly into a flexible envelope of the high altitude platform.

Weinert U.S. Pat. No. 4,768,738 describes a special thread of a conductive fiber that is woven into a flexible solar skin for absorbing radiant energy and converting it into electricity. Weinert does not specifically disclose the nature of the special fabric nor does Weinert describe the fabric as being made from flexible solar cells. Weinert does not describe the novel product or process of the invention of incorporating flexible solar cells into the thin flexible skin of high altitude airships or dirigibles.

Other prior art such as Tanzilli, et al. U.S. Pat. No. 5,427,629 pertains to a silicon carbide cover for covering traditional rigid solar cells for increasing the absorptivity of useful light. Toyama, et al. U.S. Pat. No. 5,500,055 pertains to the utilization of an irregular transparent conductive layer on a metallic substrate solar cell to increase the efficiency of the solar cell. The processing of traditional rigid silicon solar cells does not provide a flexible solar cell attached to a three dimensional flexible substrate for providing energy for high altitude platforms. Goodfellow U.S. Pat. No. 3,974,989, Abildskov U.S. Pat. No. 5,533,693 and Pavlecka U.S. Pat. No. 4,208,027 pertain to lighter-than-air fabric materials and for the lightweight connection of structural members to sheets or gores of dirigibles. These references do not include the utilization of flexible solar cells or teach or suggest the novel process of the invention.

Flexible solar cells that may be used in accordance with the invention are available in a variety of designs and configurations. For stratospheric applications flexible solar cells should include solar cells having both electrodes extending through the back of the solar cell as described in U.S. patents to Hanoka U.S. Pat. No. 5,478,402, Safir U.S. Pat. No. 5,665,175, Nishiura, et al. U.S. Pat. No. 4,609,770, Yoshida U.S. Pat. No. 5,626,686 and Kawama, et al. U.S. Pat. No. 5,665,607. Solar cells having both electrodes extending through the flexible solar cell are utilized in stratospheric and space applications since the power generating surface occupied by the solar cell is unencumbered by electrodes thereby saving surface area and weight and all connections can be insulated and shielded between the flexible solar cell layer and the airship substrate employing the flexible non-conductive adhesive.

The known flexible solar cell prior art does not provide for the direct application of flexible solar cells directly to the airship skin or airship gore and make electrical connections between layers as provided in accordance with the present invention. The prior art also does not provide for conductive conduits disposed intermediate the flexible solar cell airship skin and the substrate in which the conductive conduits are insulated by the flexible non-conductive adhesive nor does the prior art provide for the application of conductive adhesive in localized contact areas to insure a good electrical contact between the solar cell and conductive conduit. The prior art such as Dougherty U.S. Pat. No. 5,264,285 teaches flexible polymer adhesives and Walker, et al. U.S. Pat. No. 4,067,764 teaches the use of a vacuum in laminating solar cells. Neither of these references show or suggest the novel method of bonding a gas impervious flexible solar cell layer to flexible airship substrate in accordance with the invention.

The flexible solar cell layer and flexible substrate of the airship are bonded together using a flexible non-conductive polymer adhesive utilizing heat and pressure and in the preferred embodiment a vacuum. The novel process eliminates the requirement for the use of a vacuum in bonding the flexible solar cell with the flexible airship substrate where the flexible airship substrate is gas pervious. In applications where a gas pervious airship substrate is utilized small bubbles of gas or air caught between layers when expanded in the stratosphere are able to migrate through the gas pervious substrate into the interior of the airship without rupturing the airship skin on the flexible solar cell layer encapsulating the novel flexible solar ship. In the preferred embodiment of the invention in stratospheric and near space applications a vacuum is employed with or without a gas pervious airship substrate to prevent air or a gas from being trapped between the flexible airship substrate and the gas impervious flexible solar cell layer.

Unlike the prior art the invention provides for a flexible energy producing material having a flexible solar cell outer layer bonded to a flexible inner layer of fabric or plastic with one or more conductive conduits disposed between a flexible non-conductive polymer adhesive and the flexible solar cell outer layer and the fabric or plastic inner layer. The flexible inner layer may be gas-impervious or slightly gas pervious depending upon the method of the invention utilized for bonding the non-conductive polymer adhesive to the flexible solar cell outer layer and the flexible fabric or plastic inner layer. Conductive conduits between the layers are shielded and electrically insulated in the non-conductive adhesive or in the fabric layer and non-conductive adhesive.

Unlike the prior art the novel invention incorporates a flexible solar cell on portions of the airship gore as part of the envelope material of the airship which in the preferred embodiment provides three-dimensional flexibility and conforms exactly to the aerodynamic curves of the airship without having impermissible air between the layers. In the preferred embodiment, the novel invention includes specialized electrically conductive warp threads in a special gore substrate fabric to conduct solar generated electricity in the novel airship skin. In all embodiments of the invention a novel thin film flexible energy producing covering of paper thin thicknesses is provided for stratospheric applications to rigid, semi-rigid and three-dimensional expandable substrates.

BRIEF SUMMARY OF THE INVENTION

The layered skin of an airship or high altitude platform is similar to the flexible solar cell in that both are constructed of multiple layers each having a specific function. Common problems to both the airship skin and solar cell are the requirements for long term durability and resistance to solar degradation under repeated cyclical exposure to temperature and radiation. These common problems present common solutions such as the use of similar plastic films and substrates, similar metallic layers, heat transfer problems, expansions and contractions in the substrate and the integrity of the electrical connections, adhesive and the bonding and laminating of the layers that are subjected to extremes in temperature and radiation. These common problems are particularly complex where the flexible solar cell is integrated into the flexible skin of a high altitude platform such as an airship or a space craft with a flexible substrate since the requirements and stratospheric environment of a high altitude platform present an extreme application.

The layered flexible solar cell and airship skin must not delaminate and the integrity of the electrical contacts must remain intact over years of use while the airship substrate expands and contracts in an environment where direct sunlight provides a temperature of about 152° F. (67° C.) while the cold shaded side of the airship is at a temperature of about −113° F. (−172° C.). The integrity of the electrical contacts must be assembled while the flexible solar cell is bonded to the substrate in an adhesive layer which makes direct observation of the integrity of the contact extremely difficult. In addition provision must be made during the manufacturing process or in the selection of solar cell and airship substrate materials to assure that no air is trapped between the layers or that any trapped air between the layers does not expand and rupture the plastic solar cell substrate in the stratospheric environment.

The invention resolves these problems by depositing flexible solar cells directly on a flexible airship gore and bonding the flexible plastic solar cell airship gore to a flexible airship skin substrate with a flexible non-conductive polymer adhesive while conductive electrical contacts are simultaneously being made between both electrodes of the flexible solar cell and both conductive conduits disposed between the flexible plastic solar cell airship gore and the non-conductive adhesive or the non-conductive adhesive and the flexible airship substrate or a combination thereof. The conductive conduits are high voltage conduits designed for voltages in the range of 40 to 6,000 volts and must be electrically isolated from each other in the flexible non-conductive adhesive and in the layers between the flexible solar cell substrate and the flexible substrate. The conductive conduits are typically about 20 to 100 microns thick but must be from about 1 inch to 25 inches (2.5 to 64 cm) wide to carry the desired current.

The positive and negative conductive conduits may be either provided on the same layer in which distance between the conductive conduits and the non-conductive adhesive provides the necessary electrical insulation or the conductive conduits may be disposed in different layers. Where for example one of the conductive conduits is in direct contact with one terminal electrode of the flexible solar cell the non-conductive flexible adhesive is applied to anchor the electrical contact while openings in the conductive adhesive allow the other electrode of the flexible solar cell to contact the other conductive conduit through the opening in the non-conductive flexible adhesive. The integrity of this electrical contact is maintained by employing a conductive adhesive or an electrically conductive bridge between the terminal of the solar cell and the conductive conduit through an opening in the non conductive adhesive.

The positive and negative conductive conduits run the length of the novel integrated solar cell airship substrate or each of the energy producing gores of the airship. The positive and negative conductive conduits may be carried under the flexible solar cell substrate, under the non-conductive adhesive layer or in a layer of the airship substrate which may be fabric or plastic or be part of a special fabric layer containing electrically conductive threads. In applications where a special fabric is utilized or the airship substrate layer is made of fabric the warp of which includes electrically conductive metallic or doped carbon fibers to impart the desired electrical conductivity. In such applications the weft threads are electrically insulative to electrically isolate the positive and negative conductive conduits. The necessary electrical contacts to the electrically conductive warp may be made with a flexible conductive polymer adhesive through openings in the non-conductive adhesive as the flexible solar cell bearing gore is bonded to the flexible airship substrate.

The method for making the novel flexible energy producing covering includes the alignment of the novel flexible solar cell gore or flexible outer layer with the flexible substrate layer and applying an electrically non-conductive adhesive and then heating and pressing the flexible solar cell layer onto the flexible substrate layer while electrical contact is simultaneously made between the electrodes or terminals of the flexible solar cell and the conductive conduits disposed between the layers. This process may be accomplished by utilizing openings in the non-conductive adhesive which are filled with a conductive adhesive or by utilizing an electrically conductive bridging material between the terminals of the solar cell and the conductive conduit.

The novel method for making the novel flexible energy producing material of the invention is preferably carried out with not only heat and pressure as heretofore described but also under a vacuum to assure that air bubbles are not trapped between layers during the bonding process. Trapped air caught between a gas impervious solar cell airship gore and a gas impervious airship layer expands in the stratospheric environment and can cause delamination and possible failure of the solar cell layer. This may be avoided by the utilization of a vacuum as heretofore described or by selecting a gas pervious airship substrate that would allow trapped air expanding in the stratospheric or space application to be absorbed into a flexible gas pervious substrate.

BRIEF DESCRIPTION OF THE DRAWINGS

The features and advantages of the invention will be more fully discussed in the Detailed Description of the Invention in connection with the following Figures which are not to scale and have been drawn to illustrate the principles and a primary application of the invention to airships in which.

DETAILED DESCRIPTION OF THE INVENTION

The skin of a modern airship performs many different functions. It forms a barrier keeping the lift gas in and air, moisture and other contaminants out of the envelope. Lift gas may be any gas that is lighter than air but hydrogen and helium are the most commonly used. The skin of a high altitude platform has to withstand exposure to ultraviolet radiation in direct sunlight and ozone in the stratospheric environment for years without degrading. The skin of an airship is also the main structural member to which all the other components, such as the propulsion system and gondola, are attached.

The airship skin is generally formed from gores which are joined together which forms an envelope used to resist the pressure of the lift gas and maintain the airship's shape and absorb and distribute the various maneuvering and wind stresses on the envelope. Because the airship skin is exposed to the heating effects of direct sunlight and the cooling effects of the stratospheric atmosphere, it is frequently used as part of a thermal management system to regulate the temperature of the airship's components. To meet all of these requirements, airship manufacturers use one or more layers of different films and fabrics made from engineering plastic materials. Heretofore airships and the gores or building blocks of an airship have not been used to function as both the substrate material for a flexible solar cell and the outer layer of an airship that is joined by a flexible adhesive to an airship substrate material while all electrical contacts and conductive conduits are formed and insulated between the layers of the airship.

Figure 1:
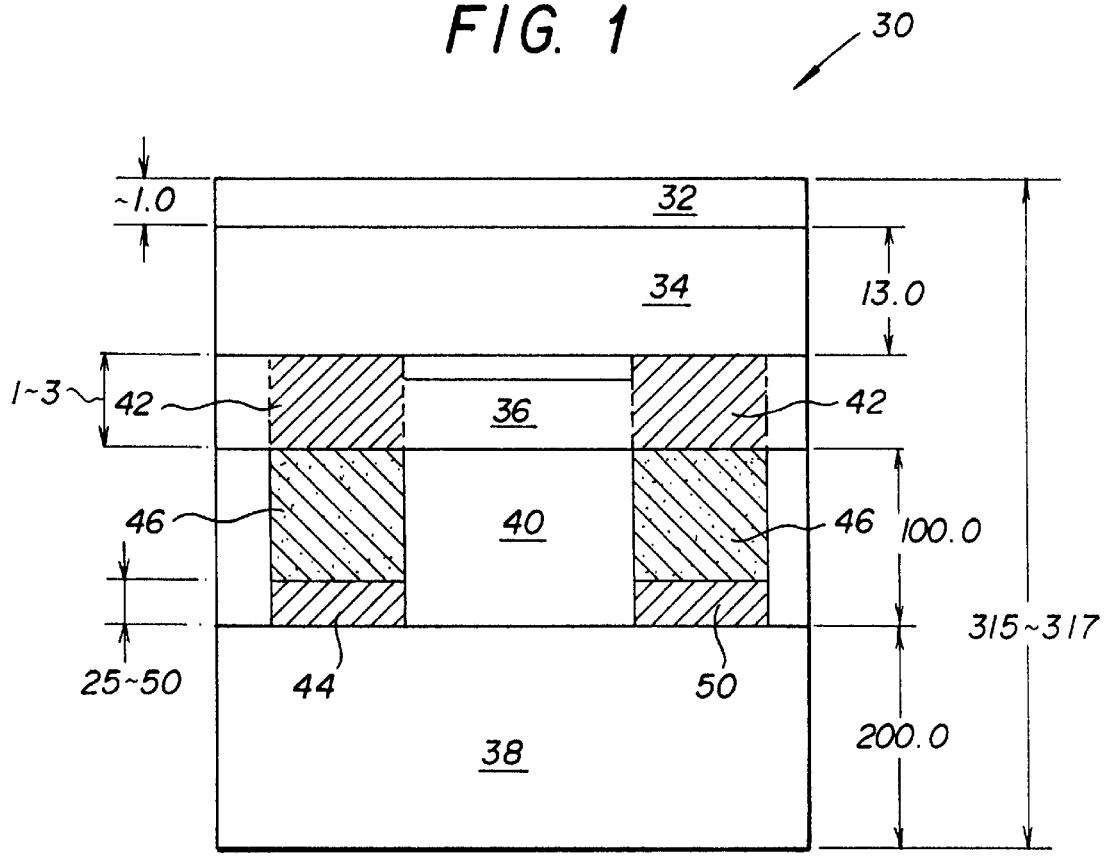
FIG. 1 is a side elevational view of the novel flexible energy producing material of the invention illustrating the relative thicknesses of the layers and total thickness of an energy producing material for constructing a novel vehicle in accordance with the invention.

Referring now to FIG. 1 the cross sectional dimensions of the novel flexible energy producing covering 30 of the invention is illustrated. The energy producing covering 30 includes a flexible solar cell layer 32 of about 1 micron thick deposited on a thin film plastic substrate layer 34 of about 13 microns in thickness with an electrical layer 36 of about 3 microns in thickness. The flexible solar cell is about 15 to 20 microns thick and when deposited on a thin film plastic of the shape of an airship gore of about 100 to 1,000 feet long (30–305 meters) the flexible solar cell serves as the outside skin layer of an airship constructed in accordance with the invention.

The thin film plastic substrate layer 34 of the flexible solar cell is bonded to the airship substrate 38 of a matching airship gore of about 100 to 1,000 feet long (30–305 meters) having a thickness of about 200 microns with a flexible non-conductive adhesive 40 having a thickness of about 100 microns. The positive terminal 42 is connected to the positive conductive conduit 44 by a conductive adhesive 46 within flexible non-conductive adhesive 40 in a manner as will be described hereinafter in greater detail. Similarly negative terminal 48 is connected to negative conductive conduit 50 by conductive adhesive 46 as will also be described hereinafter in greater detail. The total thickness of the bonded resulting gore of the novel energy producing flexible material for stratospheric applications is between about 200 to 1,000 microns but preferably about 300 to 400 microns thick and is about 300 to 1,000 feet long (100–305 meters) and about 4 to 6 feet wide (1 to 2 meters).

The positive conductive conduit 44 and negative conductive conduit 50 are designed to be about 25 to 50 microns thick but about 1 to 12 inches (2.5 to 30 cm) wide and preferably 4 to 6 inches (10 to 15 cm) wide to carry voltages in the range of 40–6,000 but preferably of about 100 to 400 volts. The positive and negative conductive conduits are designed to run the entire length of the airship gore to provide the electrical power requirements of the airship as will be described hereinafter in greater detail. The insulation of the positive conductive conduit and negative conductive conduit in view of their voltage potential and insulation requirements are altered by spacing the positive conduit away from the negative conduit laterally, horizontally or a combination thereof in the non-conductive adhesive or fabric insulator as will be described hereinafter in greater detail. As will be recognized FIG. 1 as well as all the drawings have been greatly enlarged and are not proportionally accurate in illustrating thicknesses of the thin flexible films and width of the conductive conduits in view of relative thicknesses, widths and lengths. In FIG. 1 the skin thickness dimensions have been provided merely for illustration and their proportional relationships may be modified by those skilled in the art in the construction of novel flexible energy producing materials of the invention.

Attaching flexible solar cells to an airship skin for stratospheric applications is not as simple as applying a layer of glue and sticking them together. The airship skin and the solar cell substrate must have similar stretch and elasticity properties and the electrical connections and conductive conduits must be completed as the airship substrate gore and the solar cell bearing gore are bonded together.

For stratospheric applications these problems are further complicated by the respective purposes of the flexible solar cell layer and the purposes of the airship skin layer as well as the weight limitations on an airship skin designed to stay aloft in the stratosphere. The outer layer of the airship skin is designed as a gas impervious barrier and the plastic film used for the substrate of flexible solar cells functions as another gas impervious barrier. Using a layer of adhesive to bond the outer layer of skin to flexible solar cells would encapsulate the adhesive between two gas barriers which is not recommended for stratospheric applications.

The reduced air pressure in the stratosphere, 0.65 psi (4.5 kPa) or less, would cause even the smallest air bubble trapped in between layers or in the adhesive to expand with sufficient force to delaminate the layers or burst through the plastic film substrate. It has been calculated that a bubble in the adhesive as small as 0.006 inch (150 microns) in diameter at sea level would exert enough force at 70,000 feet (21 km) to rupture a one mil thick polyvinyl fluoride film which is a commonly used outer layer material. Given the large surface area covered with the flexible solar cells, it would be impractical if not impossible to eliminate air bubbles smaller in diameter than a human hair during the bonding process. This aspect of the invention will be discussed hereinafter in greater detail in relation to the novel process and selection of substrate materials for use in the stratospheric applications of the invention.

Gluing a layer of flexible solar cells on top of the outer layer of the airship skin also creates wiring problems because the electrical layer would be outside the gas barrier. This means the wire harness or power cables that connect the solar cells to the on-board electrical equipment inside the airship have to penetrate the gas barrier. Extending the electrical connections through the gas barrier is technically difficult and failure prone because of the three-dimensional differential expansion between the multiple layers and the increased possibility of leaks. The invention solves this problem by making the outer layer of the gore of an airship skin the substrate of the flexible solar cells since the electrical layer is deposited on the inside of the gas barrier and provides in the preferred embodiment a gas semi-pervious fabric airship substrate to provide further advantages as will be discussed hereinafter in greater detail.

Figure 2:
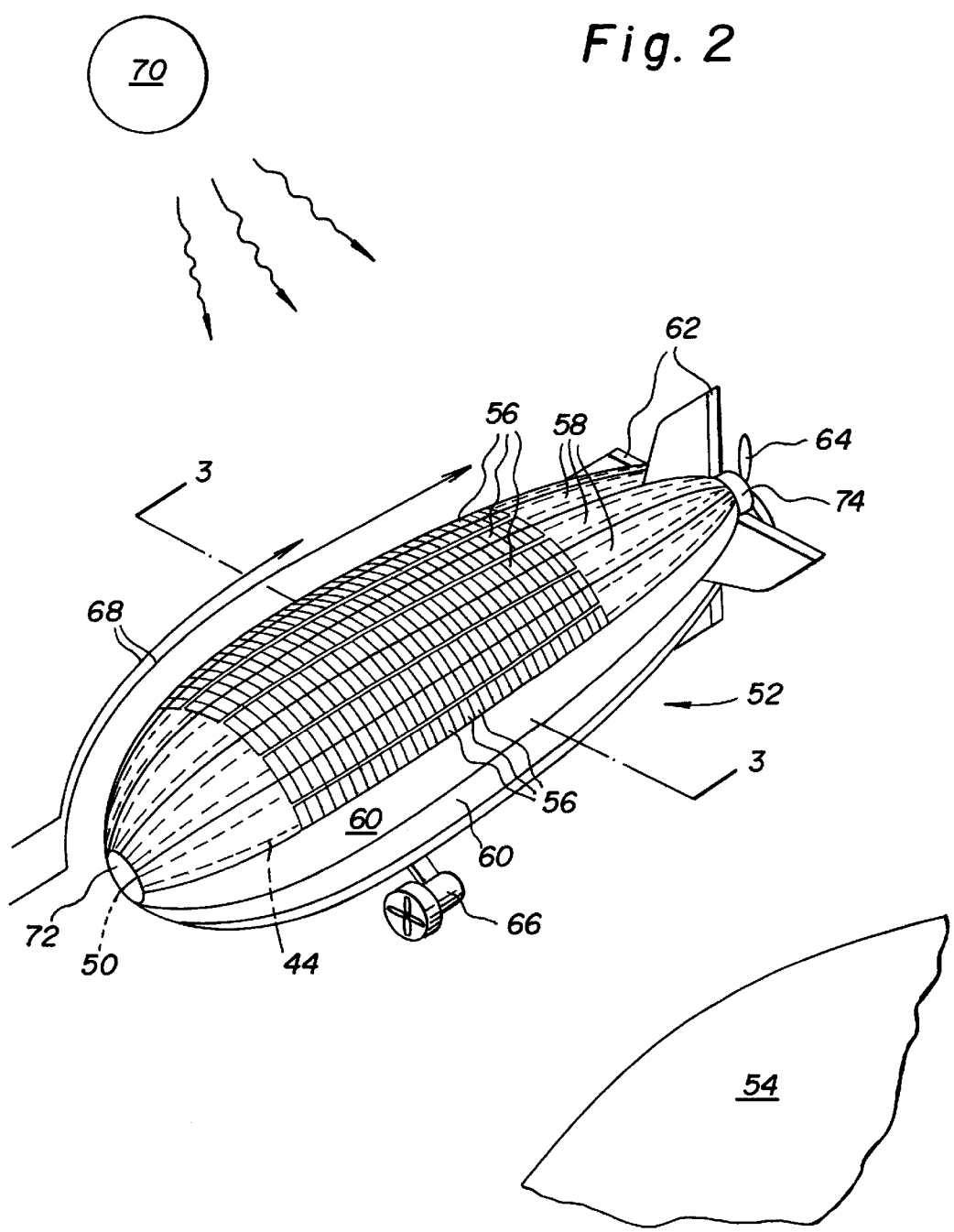
FIG. 2 is a perspective view of a stratospheric airship with the novel flexible energy producing material constructed in accordance with the invention.
Figure 3:
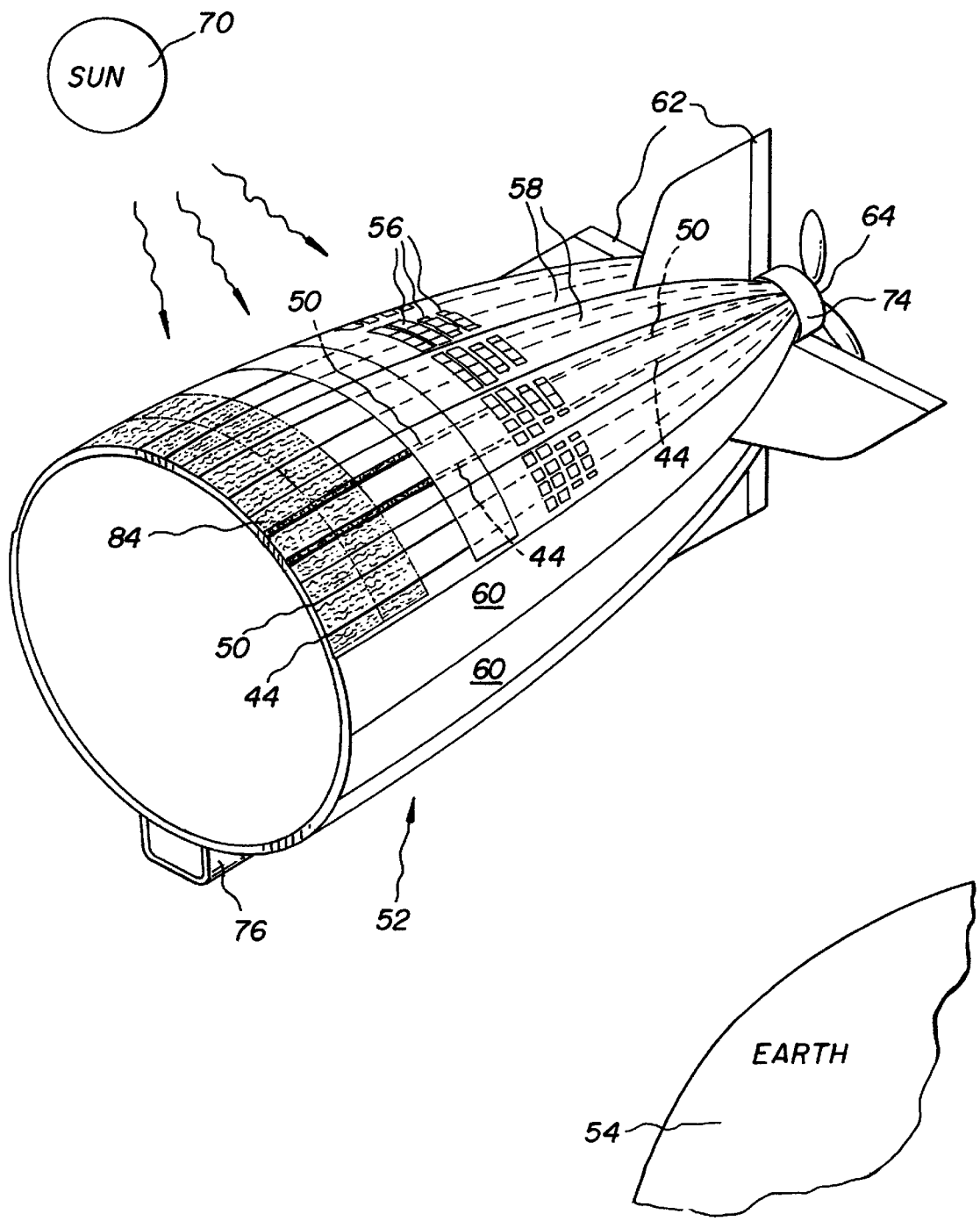
FIG. 3 is a perspective view of peeled away layers of the upper gores of the novel airship of FIG. 2 taken along the line 3—3.

Referring now to FIG. 2, a stratospheric airship 52 operating at an altitude of between twelve and thirty-one miles (20–50 Km) above the earth 54 is illustrated with a plurality of integrated flexible solar cells 56 on the upper gores 58 of the airship skin corresponding to the area of the majority of sunlight. Side and lower gores 60 do not include solar cells and are constructed in accordance with standards and materials known to those skilled in the art. Airship 52 includes a conventional rudder and elevator assembly 62 a rear electric engine 64 and two side electric engines 66 to maneuver airship 52 against the stratospheric wind 68. Since the plurality of integrated solar cells 56 are part of the airship skin they do not increase drag by delaminating or tear at structural support. The positive conductive conduit 44 and the negative conductive conduit 50 run the entire length of each of the upper gores 58 and are shielded from direct sunlight of sun 70 and UV degradation. Electrical connections are made under the nose cap 72 or the tail cap 74 to power the electrical engines and on board electronics equipment in pod 76 (FIG. 3).

In the stratosphere the sun 70 provides approximately 119 watts per square foot (1,275 watts per square meter) of radiant energy. An airship would have to be at least several hundred feet long (over 100 meters) to lift and maintain a significant payload in the stratosphere because the air is very thin at that altitude and does not provide as much buoyancy as the denser air near sea level. As a result weight considerations are particularly critical to maintain an airship in the stratosphere using the smallest amount of lift gas to maintain the largest amount of payload and efficiently utilize and divide solar energy between propulsion requirements and electrical requirements. This is accomplished with the novel flexible energy producing material of the invention since it has a weight of about 300 to 600 grams per sq meter for stratospheric applications. As a result of the light weight and efficiency, the novel flexible energy producing covering of the invention provides thousands of square feet or meters for solar power generation, which at even at a modest 5% efficiency, would translate into kilowatts of electric power. This is enough electricity to power electric engines 64 and 66 or other on-board electrical devices such as avionics, batteries, fuel cells, telecommunications equipment and the like in pod 76.

Since one horsepower equals about 750 watts, an electric propulsion system would require hundreds of kilowatts of electric power, as would telecommunications, radar or other electrical equipment that might be on-board an airship. A high voltage (100–250 volts) electrical system is required to handle this much power. However, each individual solar cell is small, ranging in size from 1–20 inches (2–50 cm) and produces only about one volt of electricity. Therefore, hundreds of individual cells must be electrically connected together in large arrays to generate this kind of power. Because of the problems associated with routing all of these connections around the individual solar cells, it is more efficient to conduct the electricity from each individual solar cell to the underside of the substrate to make the interconnections in large arrays.

Referring now to FIGS. 1–4 and 11 the best mode is illustrated in which a plurality of flexible solar cells 56 are deposited upon a gore 58 constructed of a flexible plastic polymer such as Kapton, Tedlar polyvinyl chloride, polyurethane and other similar polymer thin film plastic material suitable to provide for the construction of outer gas impervious gore of an airship. The flexible solar cells 56 may be any flexible solar cell material such as amorphous silicon, copper indium selenide, cadmium indium gallium selenide and cadmium indium gallium selenide sulfur solar cells, cadmium telluride and any other forms of flexible solar cell materials which will hereinafter be referred to as a flexible solar cell. The flexible solar cells 56 are arranged in a solar cell array 78 on gore 58 with both positive and negative terminals extending through gore 58 in a manner as will be described hereinafter in greater detail.

Figure 11:
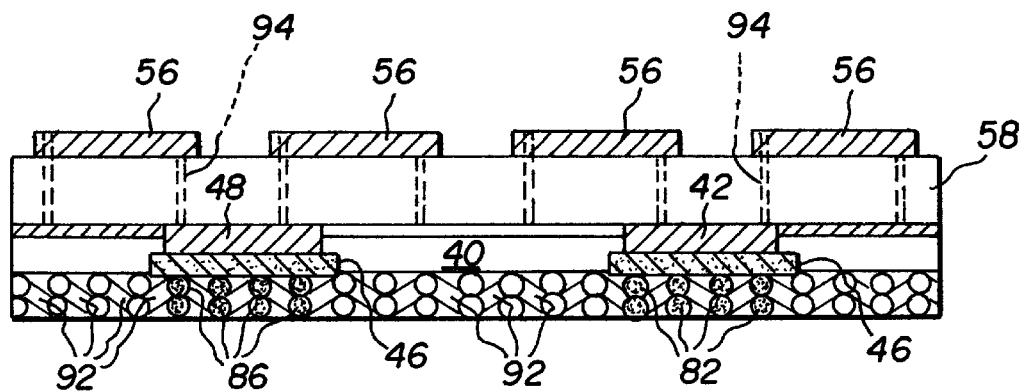
FIG. 11 is a side elevational view of a bonded novel flexible energy producing material of FIG. 4.

The flexible solar cells 56 are deposited on the thin film plastic substrate layer 34 of a size and shape to match gore 58 to form the outside gas impervious surface of airship 52. A flexible non conductive adhesive 40 surrounds openings 80 which are filled with an electrically conductive bridge material such as conductive adhesive 46 to electrically connect the positive terminals 42 to an electrically conductive warp threads 82 forming a positive conductive conduit 44 in fabric 84 which forms the airship substrate 38 and extends the entire length of airship 52. The negative terminals 48 of flexible solar cells 56 are also electrically connected to electrically conductive warp threads 86 which form a negative conductive conduit 50 in fabric 84. As will be discussed hereinafter in greater detail the electrical contact between the positive terminal and the positive conductive conduit and the negative terminal and the negative conductive conduit occur simultaneously with the bonding of the solar cell bearing gore 58 to the fabric 84 which forms the airship substrate 38 layer as illustrated in FIG. 11 in accordance with the preferred embodiment of the invention. Pads 88 indicate the area of electrical contact between positive terminals 42, conductive adhesive 46 and electrically conductive warp thread 82 and pads 90 indicate the area of electrical contact between negative terminals 48 conductive adhesive 46 and electrically conductive warp threads 86.

The flexible non-conductive adhesive 40 is about 2–4 mil thick (0.05–0.1 mm) as well as the conductive adhesive 46 which is applied selectively over the conductive thread 82 and 86. The conductive adhesive is a silicone elastomer doped with silver or aluminum compounds to make it electrically conductive. This family of adhesives was selected for their low electrical resistance of 0.01016 Ohms per inch (0.004 Ohms per cubic cm) and high flexibility of 150% percent elongation before breaking and they remain flexible and conductive from −67° F. to 392° F. (−55° C. to 200° C.) and have a good tensile strength of 200 psi (1,379 kPa).

Other materials which may be employed to provide an electrical bridge between the positive terminal 42 and positive conductive conduit 44 and negative terminal 48 and negative conductive conduit 50 include metallic conductive paints and particularly silver paints, conductive doped carbon fibers, conductive polyurethane and flocked conductive materials for bridging openings 80 in adhesive 40.

The non-conductive adhesive is a polyurethane elastomeric adhesive with a dielectric strength of 400 volts per mil (15.75 volts per micron) and a 300% percentage of elongation before breaking that remains flexible and strong from −200° F. to 176° F. (−129° C. to 80° C.). These adhesives also have an excellent tensile strength of 2500-psi (17.24 Mpa). These adhesives were selected for this application because they can withstand repeated three-dimensional flexing of the airship skin over the wide range of temperatures caused by alternate exposure to direct sunlight and the cold stratospheric atmosphere. Other polymer adhesives, such as toughened structural acrylics, may be suitable for this application provided their physical properties are similar and they meet the airship design specifications.

In the best mode of the invention, the structural layer of airship 52 is a modified structural fabric 84 having electrically conductive and non-conductive threads. The electrically conductive warp threads 82 and 86 are primarily electrically conductive and will be referred to as electrically conductive threads. The weft threads 92 of fabric 84 are electrically non-conductive and provide electrical insulation for the electrically conductive warp threads 82 and 86. The electrically conductive warp threads may be carbon fiber, metallic threads or fine wires used as threads. Carbon fibers doped with arsenic fluoride are ideal for this application because they are as conductive as copper with a much higher tensile strength. The metallic thread or fine wires may also be made from any alloy of conductive metal, such as aluminum or copper, that is strong and durable enough to withstand the constant flexing and stress.

The electrically non-conductive threads may be made from any suitable non-conducting structural plastic fiber such as polyester or aramid. Preferably the electrically non-conductive threads are also good insulators for electrically insulating warp threads 82 and 84 from each other since the warp threads may be woven to be about 1 to 18 inches wide and 0.001 to 0.005 inches thick to carry desired voltage in the range of about 40 to 6,000 volts. The electrically conductive warp threads 82 and 86 are aligned with pads 88 and 90 that are aligned with terminals 42 and 48 disposed in electrical layer 36. The electrically conductive warp threads are separated by strips of the insulating warp and weft thread which run lengthwise in the fabric from the front to the back of the airship. This integration of the electrical layer 36 and the airship substrate 38 saves weight by simultaneously utilizing the conductive conduits 44 and 50 as structural members of the stratospheric airship skin.

As previously discussed the fabric gore substrate of the airship is bonded to the solar cell gore bearing layer 32 which when bonded together forms upper gores 58 which are joined together to form airship 52. Conductive conduits 44 and 50 are part of the structural support of the airship skin. This eliminates the need for support panels and mounting devices that add extra weight and are difficult to mount onto the thin, three-dimensionally flexible airship skin. The solar cell layer 32 is less than a thousandth of an inch (25 microns) thick and conforms exactly to the three-dimensional curves of the airship's hull FIG. 1, so it does not disrupt the wind 68 flowing over the airship. Hence the aerodynamic characteristics of the airship are not affected so it will fly and maneuver the same as without the cell layer and as a result the engines do not need to use extra power to maintain a particular position due to extra drag.

Figure 5:
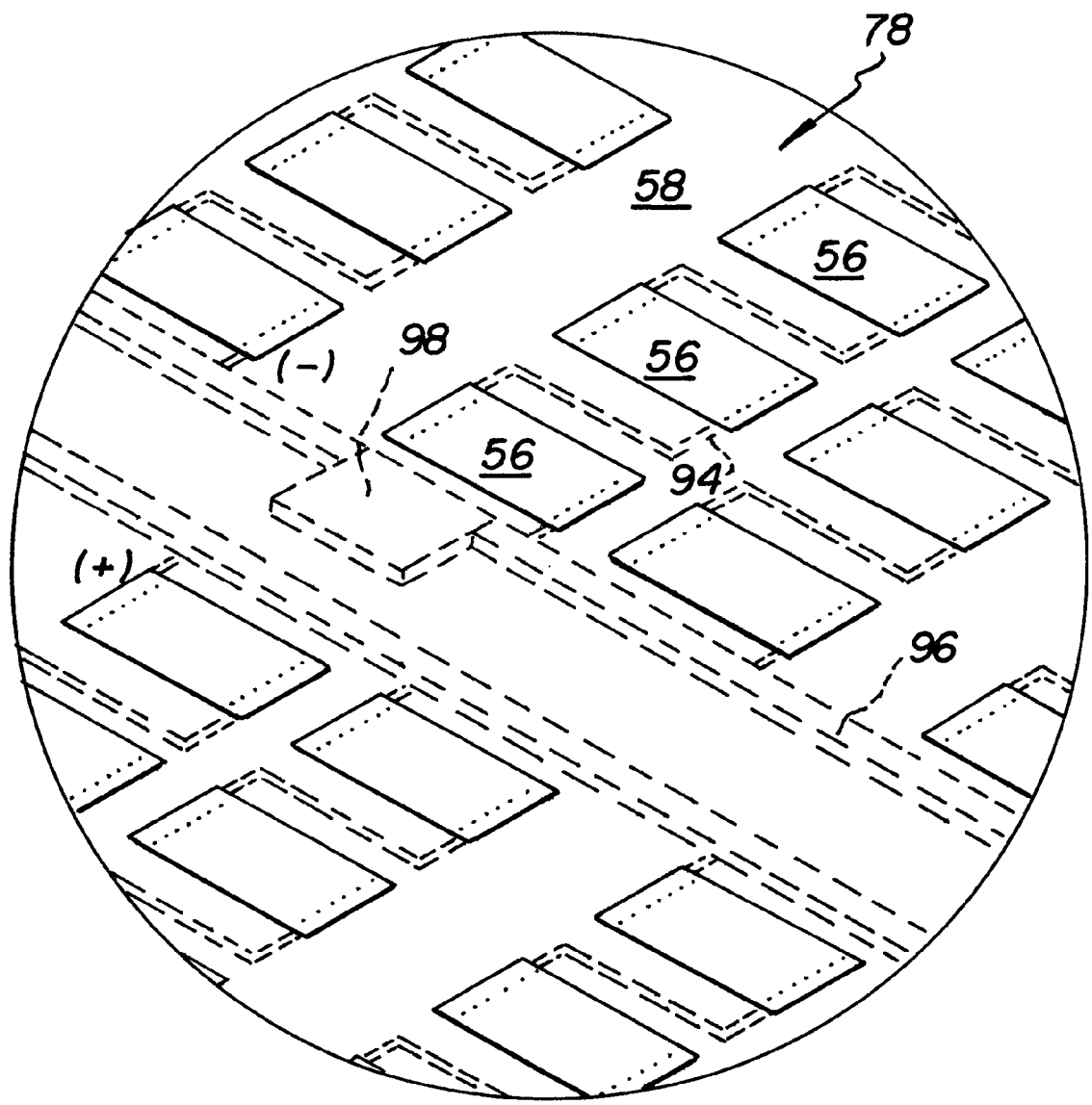
FIG. 5 is an enlarged perspective view of a portion of the novel gore circumscribed by the circular line 5—5 of FIG. 4.

Referring to FIG. 5 a solar cell array 78 is illustrated in which flexible solar cells 56 are deposited on a gore 58 having laser through holes 94 providing a positive and negative electrical contact which is sealed by the solar cell 56 to provide a gas impervious film in a conventional manner as is known to those skilled in the art of the manufacture of flexible solar cells on thin film plastic substrates. The novel thin film gore 58 bearing solar cells 56 has a series of positive and negative terminals which are connected in a conventional series connection of positive to negative terminals to obtain the necessary voltage which are connected to metallic ribbon 96 on the underside of gore 58. Metallic ribbon 96 is connected to a standard connector 98 which may provide for either or both the positive terminal 42 or the negative terminal 48. The novel thin film gore bearing flexible solar cells is different from the prior art since the thin film substrate layer 34 of the invention is of a length of an airship gore or from about 100 feet to 1,000 feet long (30–305 meters) and from about 3 feet to 12 feet (91–366 cm) wide. The largest known single sheet of flexible solar cells is only about 20 feet (6 meters) long and 4 feet (1.2 meters) wide.

The invention further differs from the prior art in providing an airship substrate gore of a dimension matching the solar cell bearing gore and bonding the two layers together with a flexible non-conductive adhesive bonding layer all electrical contacts are made to produce a novel gore for constructing novel stratospheric high altitude platforms and novel stratospheric airships. The novel gore bearing solar cell arrays 78 terminates in positive terminal 42 and negative terminal 48 which electrically contact conductive warp threads 82 and 86 of fabric 84 through openings 80. The electrical contact is made through an electrical conductive material between terminal 42 and thread 82 and terminal 48 and thread 86 which may be electrically conductive paint, conductive adhesive, conductive carbon or any other thin lightweight conductive material that may be placed or used in opening 80 to provide an electrical contact while gore 58 and airship substrate gore 100 are bonded together with flexible non-conductive adhesive 40. The use of lightweight solder, conductive paint or conductive adhesive is preferred since it reduces weight and increases the altitude at which the novel airship can operate on a given volume of lift gas.

In the best mode of the invention, the conductive conduits 44 and 50 that carry the electricity from the electrical layer 36 to the on-board electrical devices are integrated with the airship substrate 38 as part of a conductive gas pervious fabric. Integrating the conductors with the structural airship substrate 38 eliminates an additional layer of conductors thus reducing the total weight of all the layers and adding strength to the paper thin bonded novel energy producing airship skin.

Figure 6:
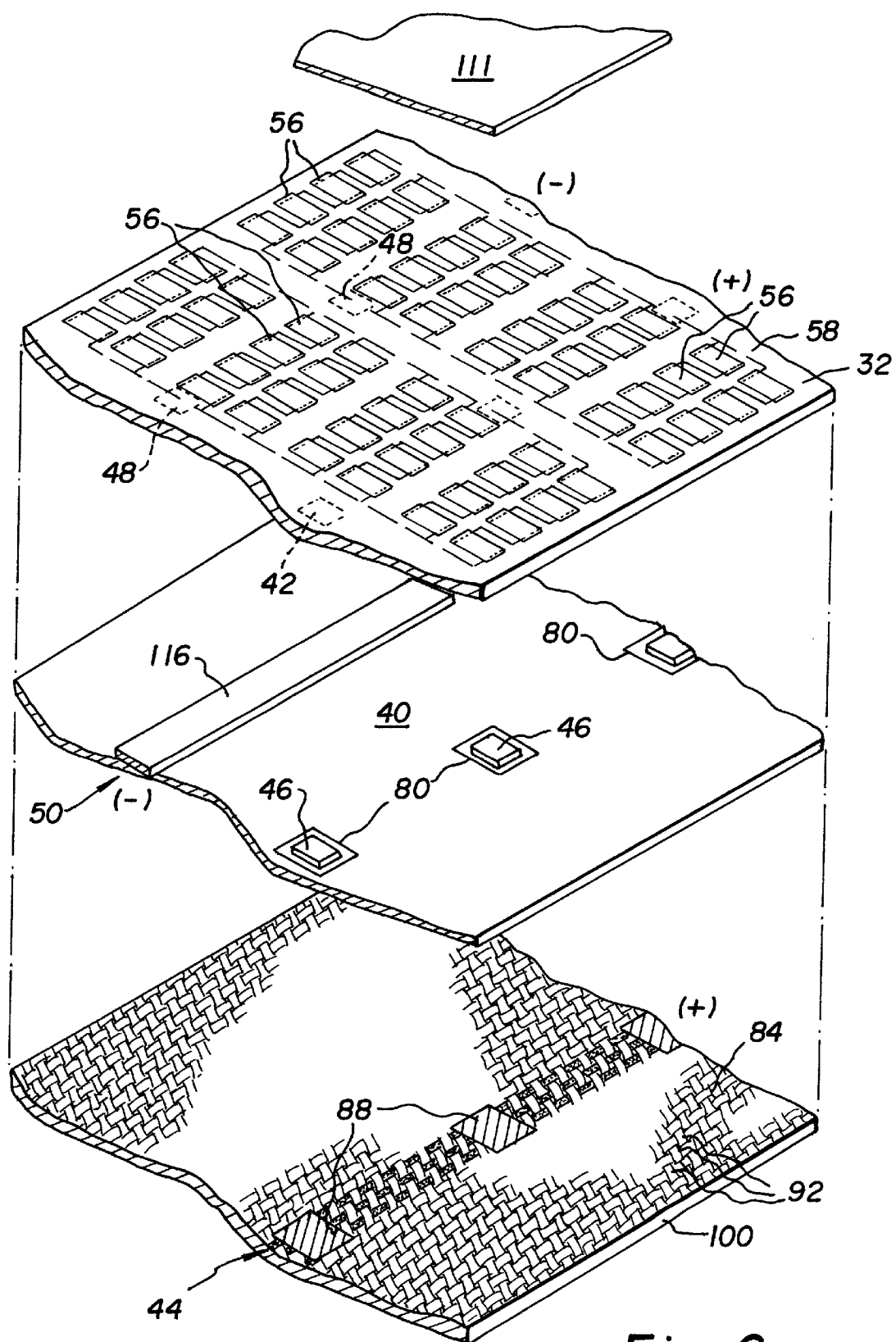
FIG. 6 is an exploded perspective view of a novel energy producing material similar to FIG. 4 with a protective layer and constructed in accordance with an alternative embodiment of the invention.
Figures 7, 8:
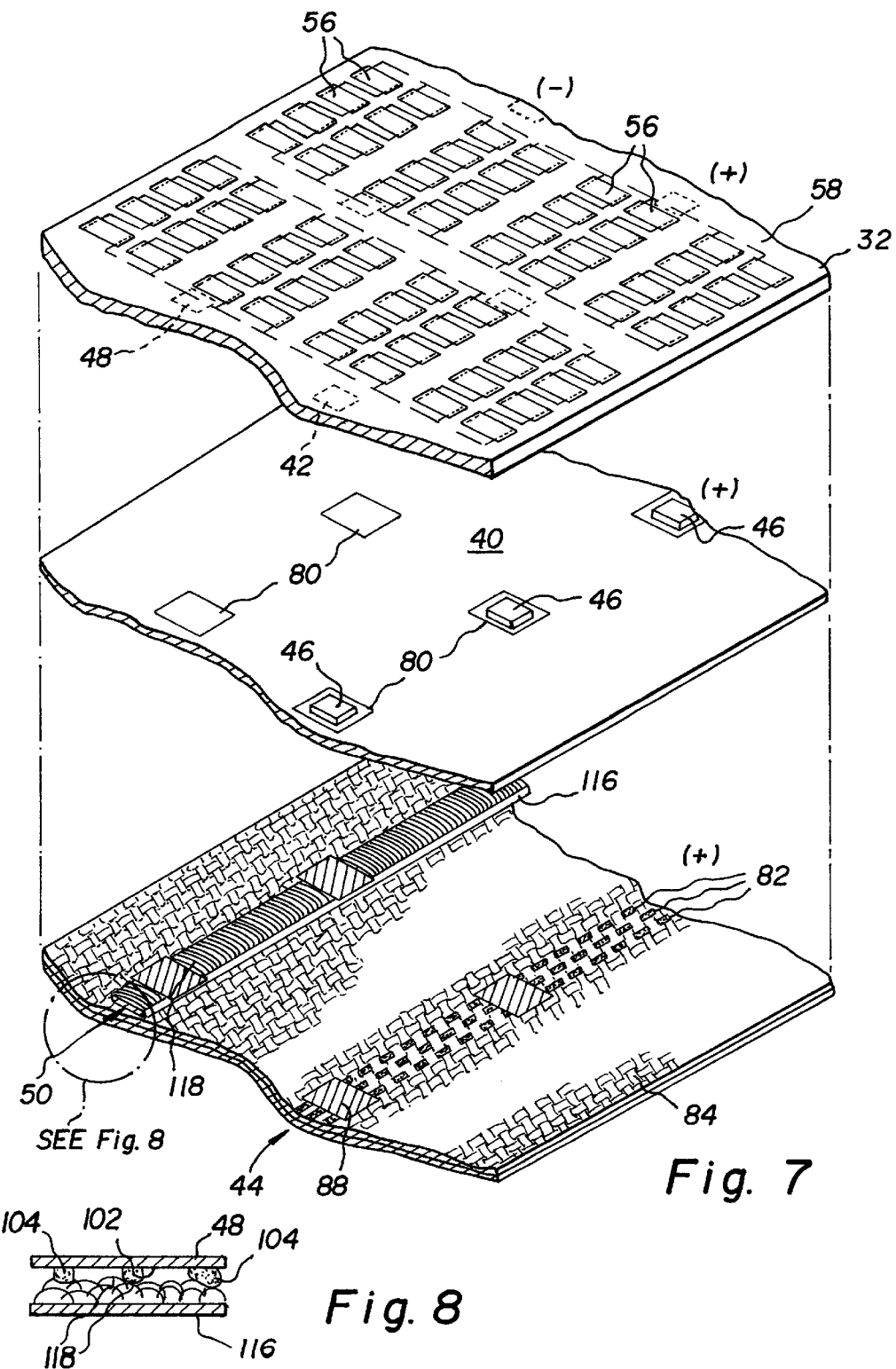
FIG. 7 is an exploded perspective view of a novel energy producing material similar to FIG. 6 and constructed in accordance with a further embodiment of the invention.
FIG. 8 is a side elevational view illustrating the electrical connection between the heat activated solder surface of an electrical terminal and a conductive conduit in the area circumscribed by the circular line 8—8 of FIG. 7.

Referring to FIGS. 6, 7 and 8, alternative embodiments of the best mode of the invention are illustrated in which airship substrate 38 forms an airship substrate gore 38 utilizing fabric 84 woven from an electrically conductive warp thread 82 and electrically insulating weft threads 92. The electrically conductive warp thread 82 in the best mode of the invention would be carbon fiber doped with arsenic fluoride because it is as conductive as copper with a higher tensile strength. Alternate embodiments include thread made from metallic fibers of aluminum or copper, or fine wires made from any alloy of conductive metal that is durable enough to withstand the constant flexing and stress. The conductive warp thread 82 is used in the warp of the fabric so it runs lengthwise from front to back of the stratospheric airship 52. The warp of a fabric is the thread running lengthwise in the loom.

Electrically non-conductive weft threads 92 may be made from any suitable non-conducting engineering plastic fiber such as polyester or aramid. The electrically non-conductive weft thread 92 is used to electrically isolate the electrically conductive warp. The weft of a fabric is the thread woven across the warp. In an alternative embodiment of the invention (FIG. 6) the electrically conductive warp thread 82 is aligned so that it is disposed under the positive novel solar cell array connectors 98 which conductive threads are designed to form the positive conductive conduit 44 of airship 52. A negative conductive conduit 50 is provided by conductive ribbon 116. Conductive ribbon 116 which contacts negative terminals 48 when fabric 84 forming airship substrate 38 is bonded to solar cell bearing gore 58. The conductive warp thread 82 in this embodiment of the invention is electrically isolated horizontally and vertically from conductive conduit 50 during the simultaneous connection of electrical connections and bonding of layers. The modified structural fabric 84 is estimated to be in the range of 8 mils (200 microns) thick. The exact diameter of the conducting thread and number of threads per conductor are determined by the structural and electrical requirements of the airship.

In FIG. 6 a further embodiment of the invention is illustrated in providing a protective coating 111 over the flexible solar cells 56. Protective coating 111 in the form of a polymer film is accomplished after solar cells 56 are deposited on gore 58. The protective coating can be various types of coatings placed on flexible solar cells and can be a ½ to 1 mil film of an ethylene tetrafluoroethylene polymer such as Tefzel® or a polyvinyl fluoride film such as Tedlar®. These films accommodate the three dimensional stretching and flexing required for airship applications. Ethylene tetrafluoroethylene fluoropolymer films are relatively inert, do not appreciably interfere with the performance of solar cells. and is extremely flexible and possesses a wide range of operating temperatures.

Figure 13:
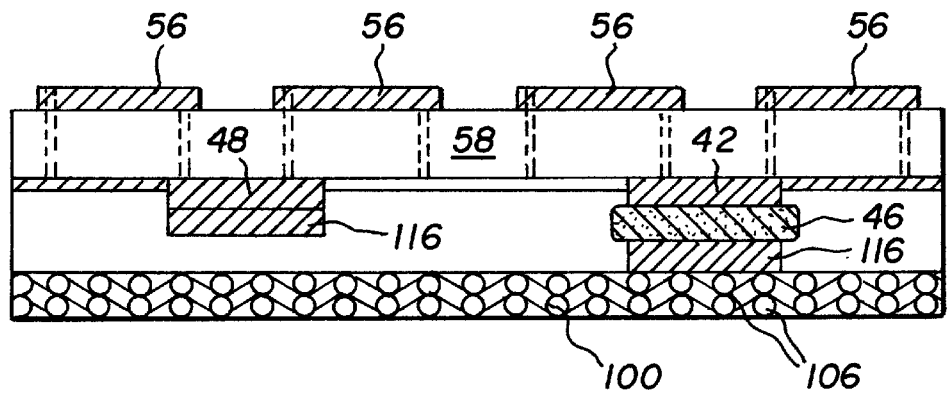
FIG. 13 is a side elevational view of a bonded novel flexible energy producing material of FIG. 10.

Referring now to FIGS. 7, 8 and 13 alternative embodiments of the preferred embodiment of the invention are illustrated employing fabric 84 in the structural substrate layer forming airship substrate gore 100. In FIG. 7 the underside 102 of negative terminal 48 includes a plurality of pin-like points of solder 104 which connect negative terminal 48 through non-conductive adhesive 40 to a negative conductive conduit 50 in the form of a conductive ribbon 116 having a conductive fibrous surface 118 while the positive terminal 42 is connected through openings 80 in non-conductive adhesive 40 to a positive conductive conduit 44 in the form of an electrically conductive warp thread 82. FIG. 13 illustrates a further embodiment of the invention where like in FIG. 6 a conductive ribbon 116 forms negative conductive conduit 50 on top of adhesive layer 40 and makes electrical contact with negative terminals 48 of solar cells 56 when solar cell bearing gore 58 is bonded to airship substrate gore 100 to form gore 58. Fabric 106 of substrate gore 100 does not include electrically conductive threads and as a result positive terminal 42 is connected to conductive ribbon 116 through electrically conductive adhesive 46.

Figure 9:
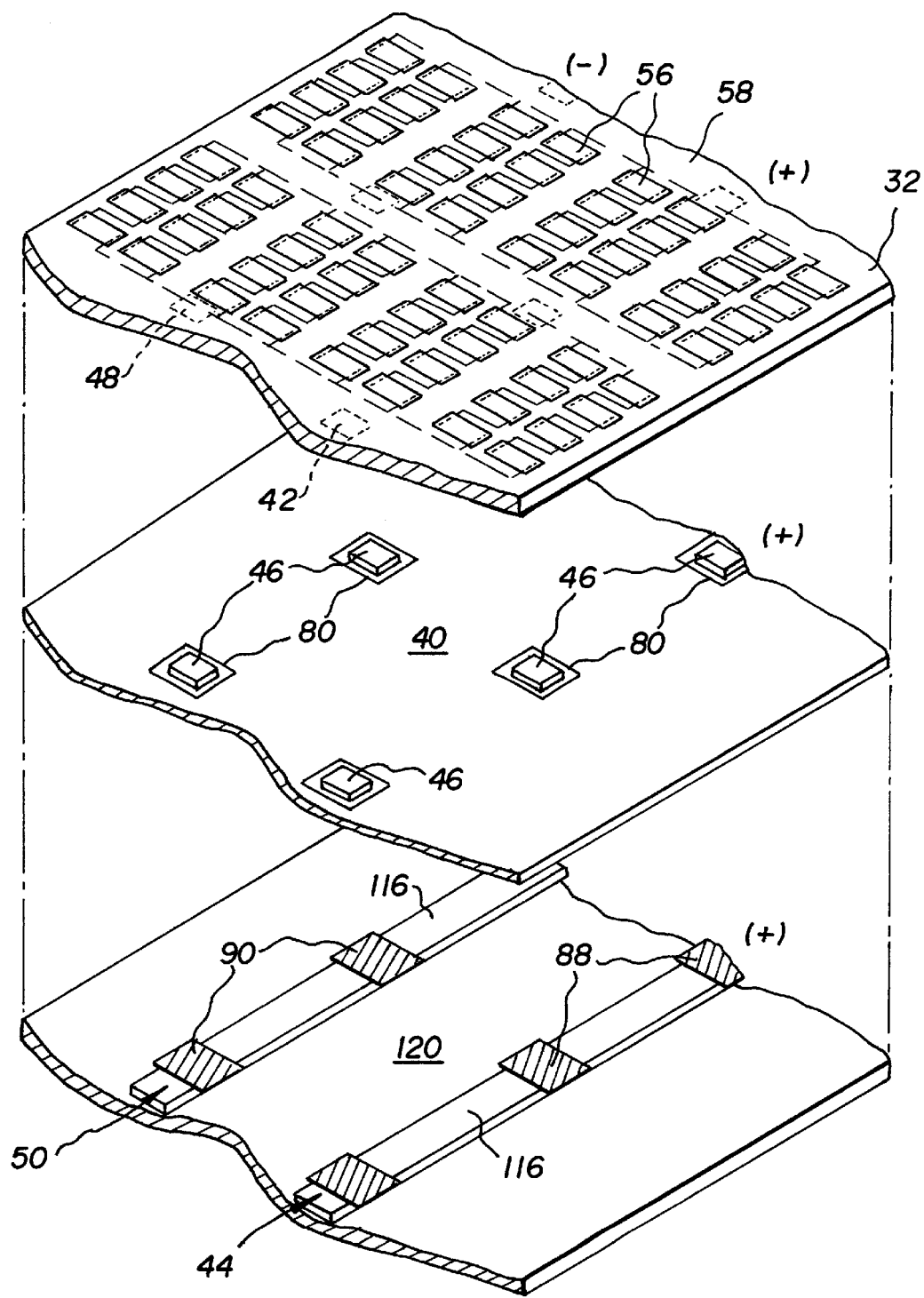
FIG. 9 is an exploded perspective view of a novel energy producing material similar to FIG. 4 illustrating a flexible polymer airship substrate and conductive conduits in accordance with an alternative embodiment of the invention.

In an alternative embodiment of the invention the airship substrate 38 structural layer is not interwoven with the conductive conduits 44 and 50 as previously discussed. As illustrated in FIG. 9 both gore 58 and the airship substrate 38 are constructed of gas impervious films. This embodiment of the invention is advantageous for airships with structural layers made out of engineering plastic films such as polyurethane or polyethylene or in applications where a gas impervious layer is desired between the lift gas and a second gas impervious layer is desired between the adhesive layer and the substrate layer. In this embodiment of the invention, conductive ribbons 116 made from aluminum, copper, conductive carbon or other suitable conductive material are utilized in place of the conductive warp threads 82 and 86 and conductive ribbons 116 with or without conductive fibrous surface 118 are utilized to form conductive conduit 44 and 50. The exact size and shape of the conductive ribbons 116 depend upon the design of the airship and electrical system and generally are a few mils thick and several inches (1 inch=2.5 cm) wide to carry the hundreds of volts required for the anticipated power levels.

Figure 10:
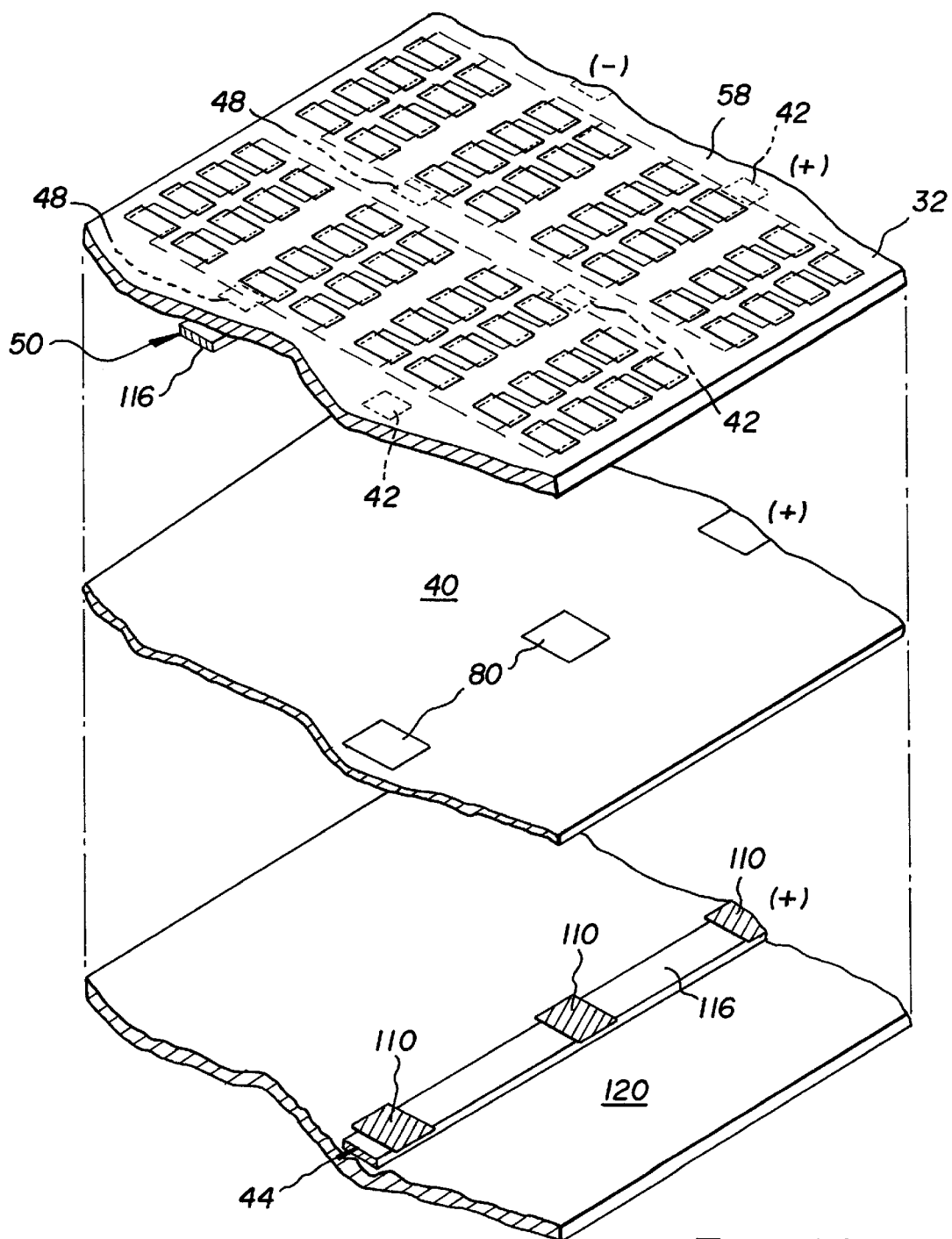
FIG. 10 is an exploded perspective view of an alternative embodiment of FIG. 9.
Figure 12:
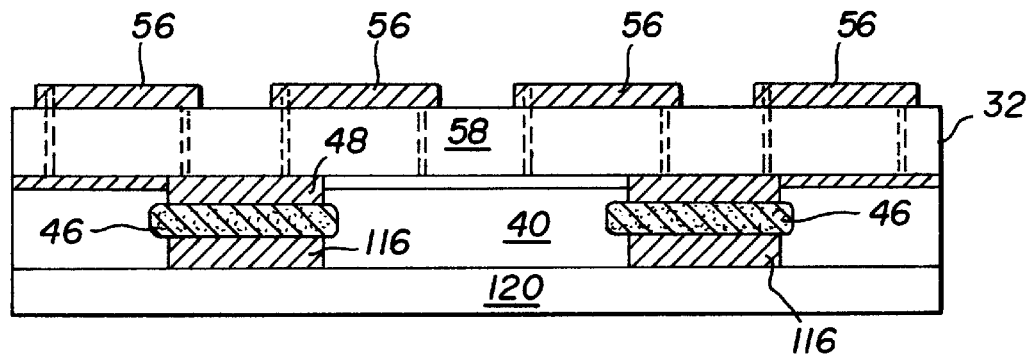
FIG. 12 is a side elevational view of a bonded novel flexible energy producing material of FIG. 9.
Figure 14:
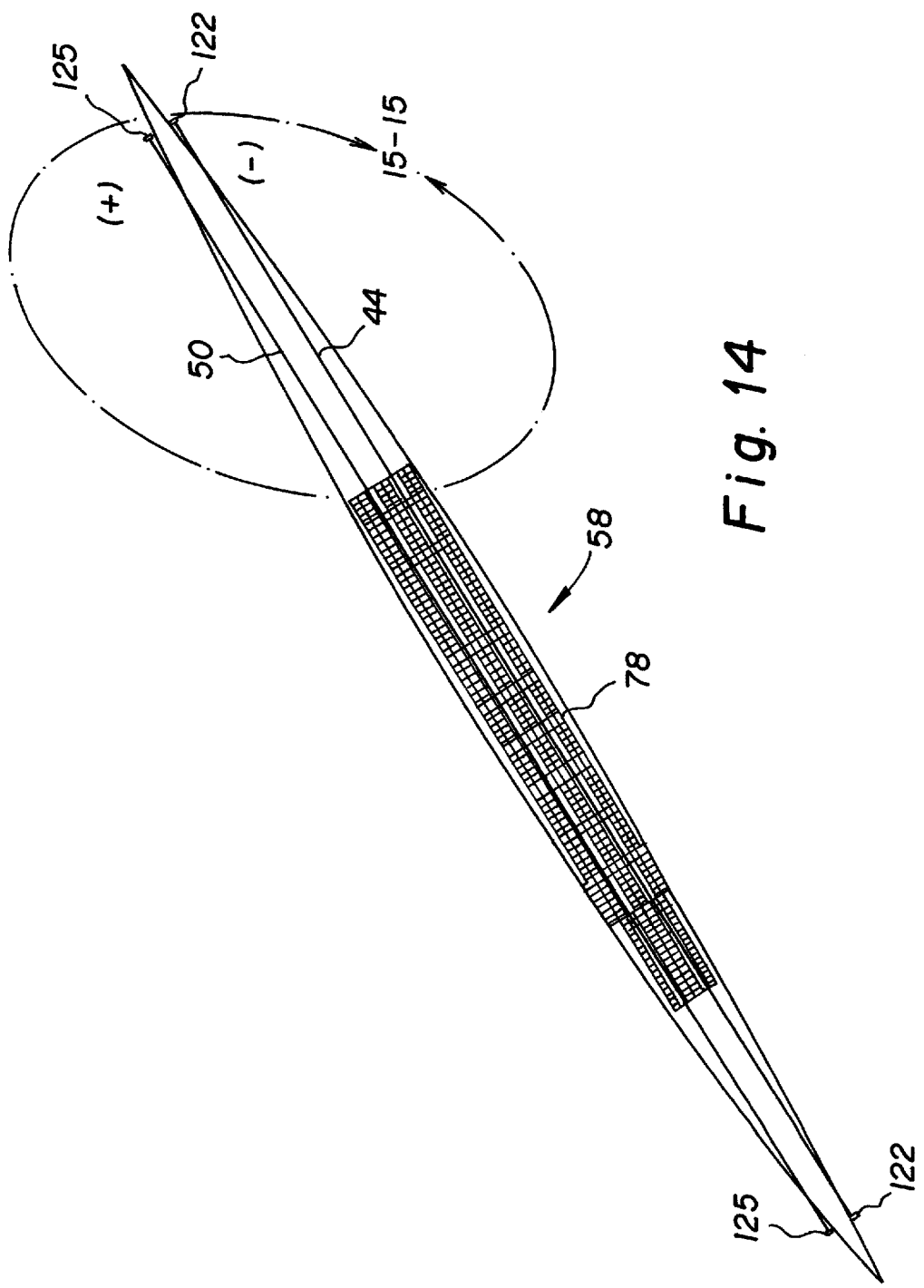
FIG. 14 is a top perspective view of a novel airship gore including the novel energy producing material of the invention.
Figure 15:
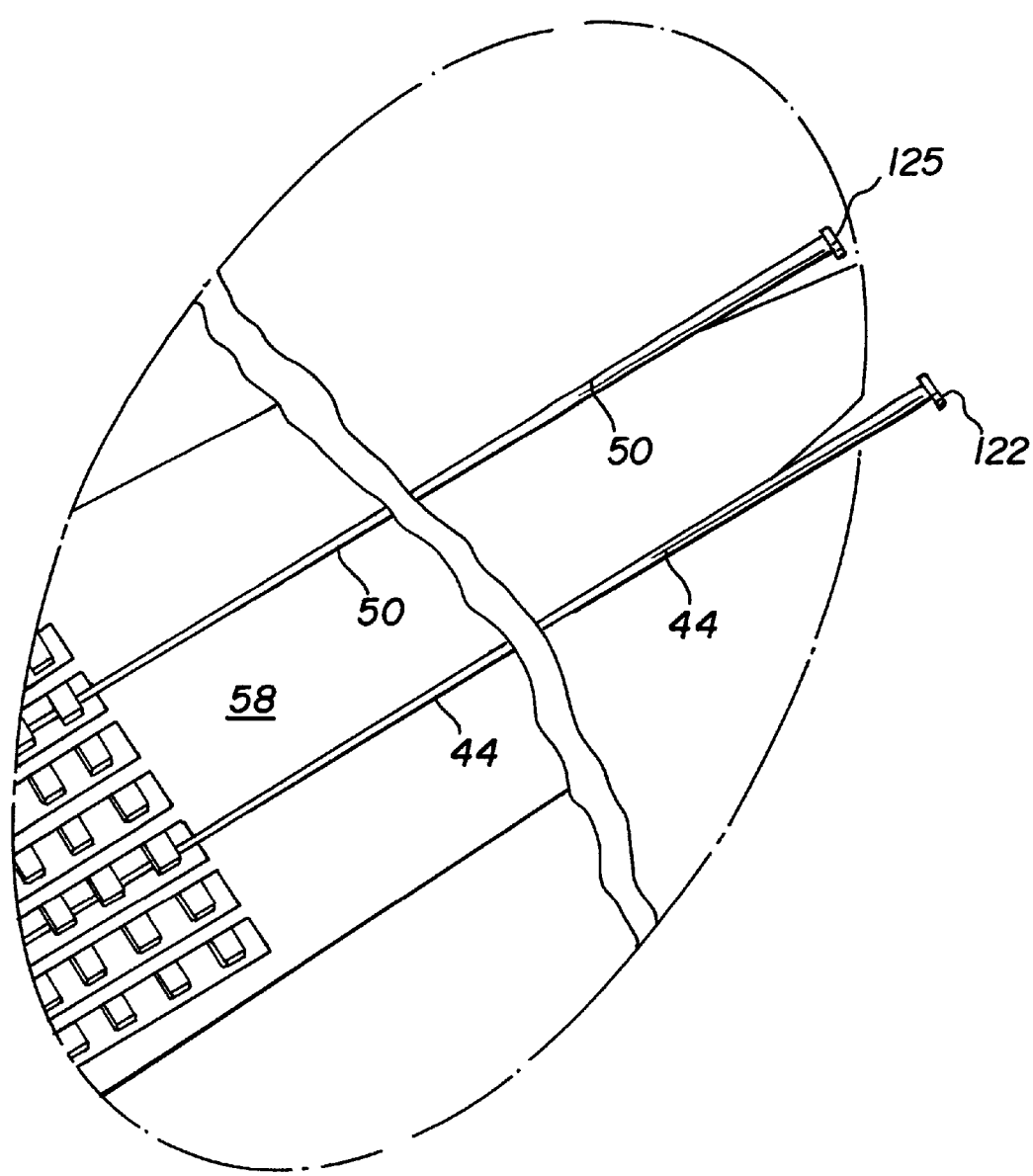
FIG. 15 is an enlarged portion of the end of the airship gore circumscribed by the circular line 15—15 of FIG. 14.

Referring to FIGS. 9, 10 and 12 in this embodiment conductive ribbon 116 forming positive conductive conduit 44 is placed on top of the polymer plastic structural layer 120 of airship 52 and aligned with the openings 80 containing conductive adhesive 46 and the positive terminal 42 in gore 58. Similarly the negative conductive conduit 50 formed by the other ribbon 116 is placed on or formed on layer 120 and is aligned with openings 80 containing conductive adhesive 46 and the negative terminal 48 in gore 58. The metallic ribbons 116 extend from the front to the back of the airship gore 58 and have a positive plug 122 and a negative plug 125 (FIG. 14).

The structural layer 120 forming airship substrate gore 100 is a structural plastic film suitable for use in airships and may be a polyester film, a polyaramid film, a polyvinyl chloride film, polyamide film and be sold under the trademarks Mylar or Kevlar. The flexible adhesive layer consists of conductive adhesive 46 and non-conductive adhesive 40 applied in the same manner as are applied to the conductive threads 82 in a manner that will be described hereinafter in greater detail in regard to the novel processes of the invention. When the layers of gore 58 namely substrate 32 and structural layer 120 are bonded or laminated together the electrical connections are formed at the same time as the layers are bonded together with the non-conductive adhesive 40 to form the novel conductive material as illustrated in FIG. 12.

Referring now to FIG. 10 a further alternative embodiment of the invention is illustrated in which the conductive ribbon 116 forming negative conductive conduit 50 is disposed above adhesive 40 and in direct contact with negative terminal 48 and where the positive terminal 42 is electrically connected to metallic ribbon 116 and to the positive conductive conduit 44 with conductive paint 110 through openings 80 of non-conductive adhesive 40. Alternatively positive terminal 42 can be connected to positive conductive conduit 44 with conductive adhesive or conductive carbon materials.

Referring now to FIGS. 14, 15, 16, 17 and 18 the novel process for producing a novel airship from novel gores 58 containing flexible solar cells 56 to form oriented solar cell arrays 78 will be described in greater detail. As heretofore discussed the invention provides for the simultaneous bonding of the flexible solar cell layer to a flexible substrate with a non-conductive adhesive and the making of the necessary electrical contacts to at least one conductive conduit disposed in or between the flexible substrate and the flexible solar cell layer. In the preferred embodiment of the invention to stratospheric airships the simultaneous bonding of the flexible solar cell gore with the non-conductive adhesive also provides the simultaneous solar cell terminal electrical contacts between a positive conductive conduit and a negative conductive conduit disposed in or between the flexible substrate and the flexible solar cell layer. As heretofore discussed the conductive conduits may be on the same layer and laterally insulated from one another by the non-conductive adhesive or on different layers and laterally and horizontally insulated form one another with the non-conductive adhesive.

The final bonded novel energy producing material in the best mode has a final thickness of about 200 to 400 microns and a weight of about 300 to 500 grams /m$^2$. This lightweight tough flexible energy producing material is particularly advantageous in stratospheric and near space applications since weight is a limiting factor and can be compensated for only by increased volume of lift gas which demands more skin surface area which requires more weight. The process of the invention and novel energy flexible producing material can be made in accordance with the invention to provide additional and thicker layers for less critical applications.

In the process for producing the novel flexible energy producing material the flexible polymer plastic substrate may be formed of a size and shape slightly larger than the final bonded flexible energy producing material. The flexible solar cells deposited on the flexible polymer plastic substrate may also vary in size or shape as required by the particular application. The preferred application in accordance with the novel airship application of the invention provides for the application of the flexible solar cells 56 to a flexible polymer plastic substrate 124 (FIG. 17) slightly larger than the shape of gore 58. The solar cells 56 are applied to plastic substrate 124 and electrical connections between the flexible solar cells are made in accordance with processes known in the prior art to produce the desired current and voltage requirements preferably with solar cell positive terminals 42 and a solar cell negative terminal 48 provided on the bottom side 126 (FIG. 21) of substrate layer 124.

Substrate 124 with oriented solar cells arrays 78 are placed on a roll 128 (FIG. 18) which is designed to hold a substrate 124 holding a plurality of gores 58 bearing solar cells. A corresponding tractor roller 130 is designed to pull substrate 124 through a plurality of rollers to laminate the solar cell bearing substrate 124 to the structural layer 132 of the airship substrate 38. Structural layer 132 is placed on roll 134 and similarly fed through the underside of a plurality of rollers to tractor roller 130. Structural layer may be fabric, polymer plastic or modified conductive fabric 84 and is of a matching length and width to solar cell flexible polymer plastic substrate layer 124.

Figure 19:
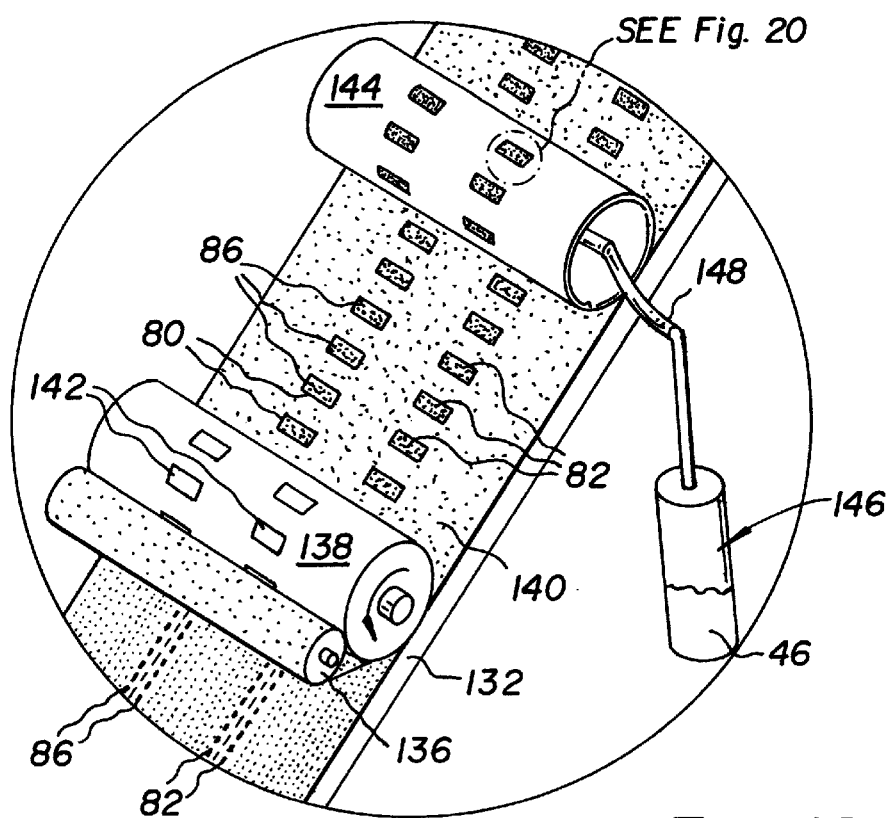
FIG. 19 is an enlarged view of the application of adhesive as circumscribed by circular line 19—19 of FIG. 18.
Figure 20:
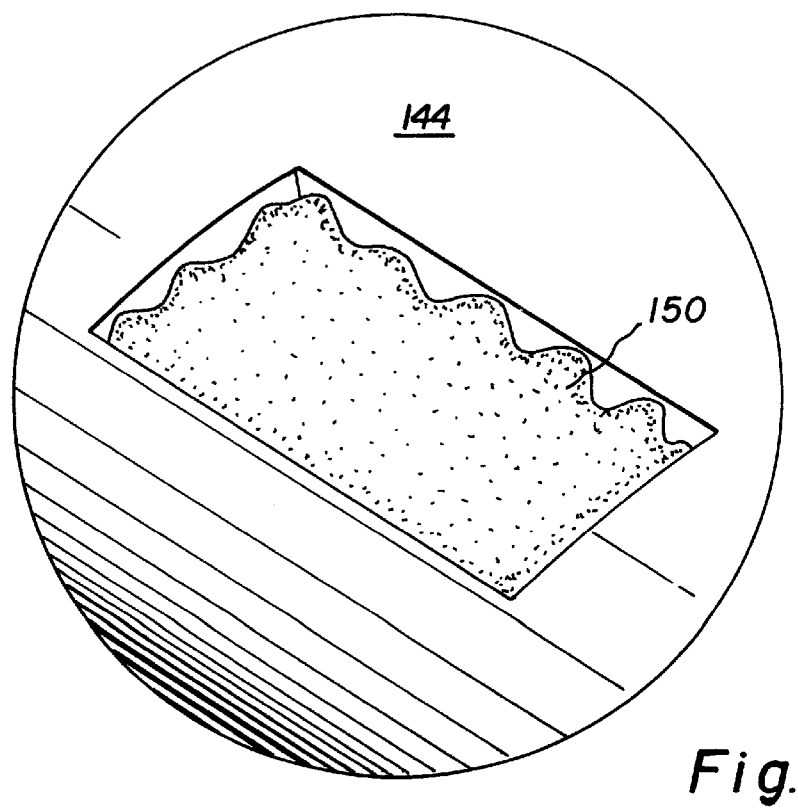
FIG. 20 is an enlarged view of the conductive adhesive application roller as circumscribed by the circular line 20—20 of FIG. 19.

Conductive conduit 44 and 50 may be provided in the fabric or in a polymer film forming structural layer 132. In one embodiment conductive conduit 44 and 50 are on separate rolls (not shown) and are fed through the plurality of rollers on the same or different layers between the structural layer 132 non-conductive adhesive 40 layer and the solar cell flexible polymer plastic substrate layer 124. In the preferred embodiment structural layer 132 is composed of fabric 84 having conductive warp threads 82 and 86 and is carried on roll 134. The non-conductive adhesive 40 is also in a roll carried by adhesive roller 136 (FIG. 19). Cutter roller 138 cuts openings 80 in adhesive layer 140 with adhesive cutters 142 before adhesive layer 140 is applied to structural layer 132 over conductive conduit 44 and 50 as tractor roller 130 draws the structural layer 132 and solar cell flexible polymer plastic substrate layer through a plurality of bonding rollers.

The exposed conductive conduits 44 and 50 through openings 80 are then filled with a conductive adhesive using filler roller 144. Filler roller 144 is fed conductive adhesive 46 from reservoir 146 under pressure through tube 148 which feeds filler roller 144. Filler roller fills openings 80 with conductive adhesive through openings 150 in filler roller 144.

Figure 4:
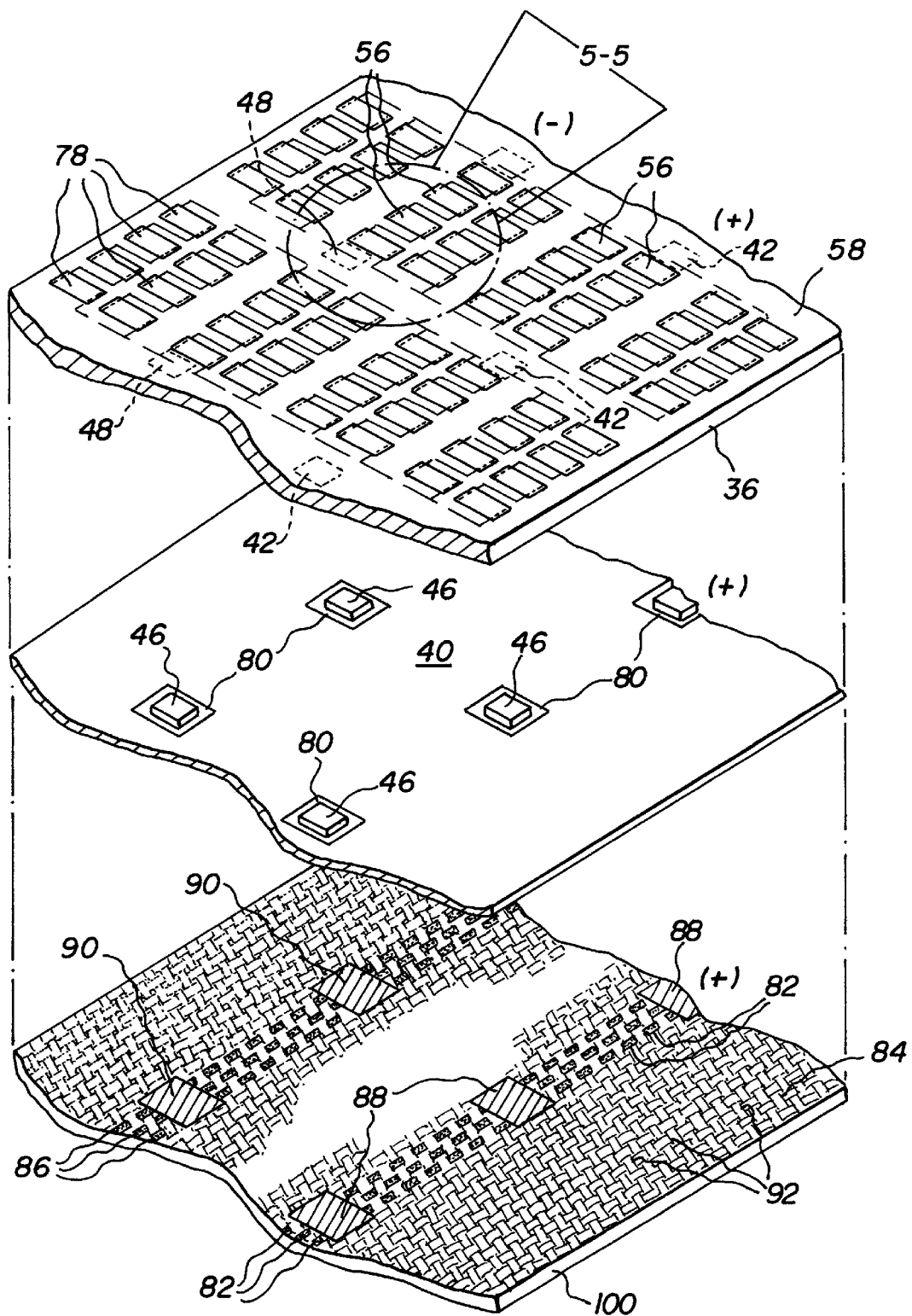
FIG. 4 is an exploded perspective view of a section of a portion of the gore of the novel flexible energy producing material constructed in accordance with the preferred embodiment of the invention.
Figure 17:
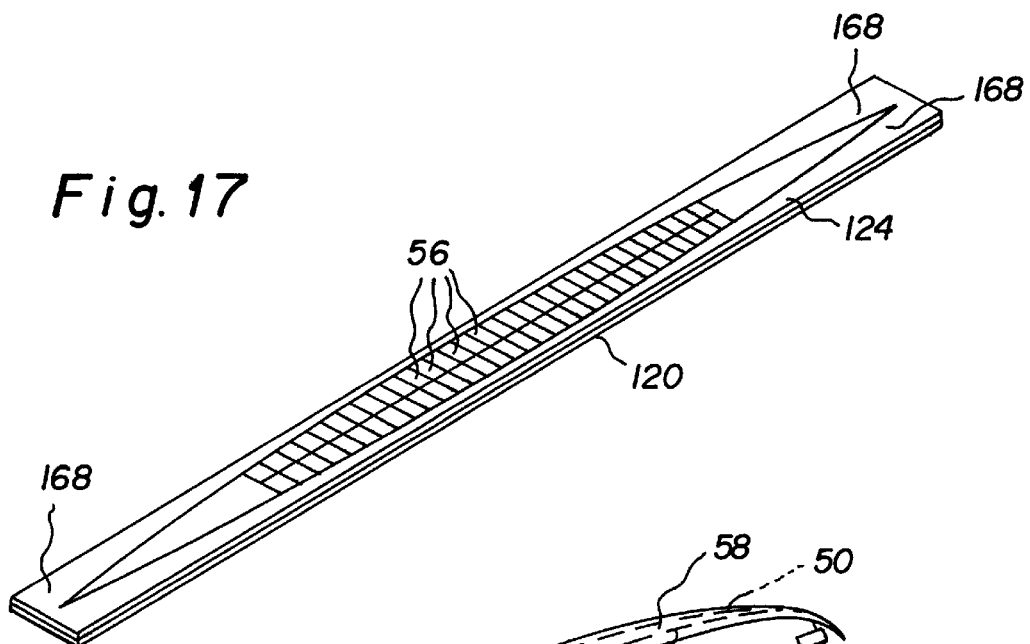
FIG. 17 is a perspective view of a novel flexible energy producing covering constructed in accordance with the invention.
Figure 16:
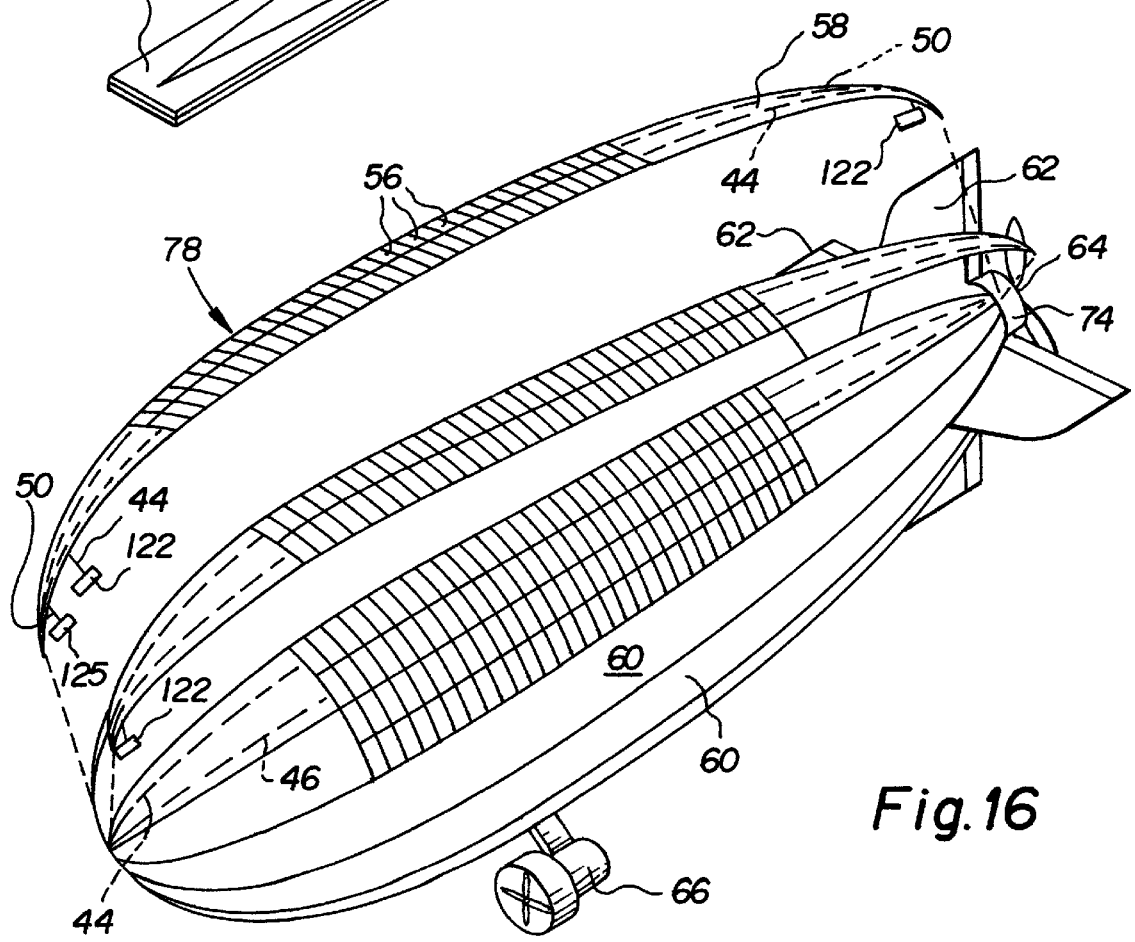
FIG. 16 is a perspective view partially exploded illustrating the construction of the novel airship utilizing the airship gores illustrated in FIG. 14.

After the application of adhesive layer 140 and the application of conductive adhesive 46 tractor roller 130 continues to advance layer 124 and layer 132 toward tractor roller 130 and to alignment and mating rollers 158. The joined layers 124 and 134 are then bonded together by heat roller 160 and pressure roller 162. The bonded layers are then advanced through a pair of tensioning rollers 164 before the novel flexible energy producing material is rolled onto tractor roller 130. The novel process as described produces the novel energy producing material as illustrated in FIGS. 4, 11 and 14. The resulting energy producing material is then cut to form the gore 58. At or near the ends the conductive conduit 44 and 50 are exposed and plugs 122 and 125 are added at both ends to produce the novel energy producing flexible gore 58 as illustrated in FIG. 17. The upper gores 58 are joined together as illustrated in FIG. 16 to form a novel airship in accordance with the invention. Electrical connections are made under nose cap 72 and tail cap 74 of the novel airship as heretofore described.

Figure 21:
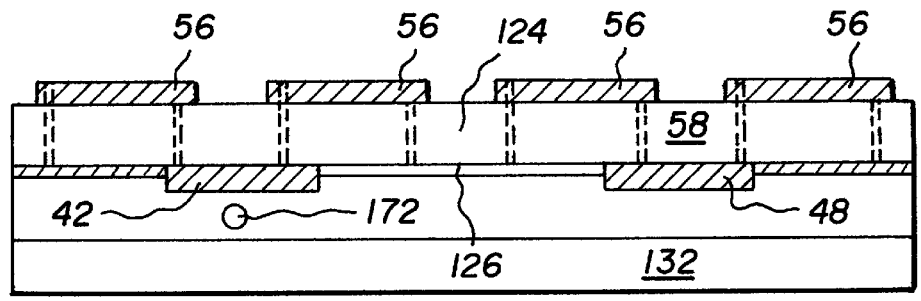
FIG. 21 is a cross section of an airship constructed with a gas impervious substrate constructed in a process without employing a vacuum.
Figure 22:
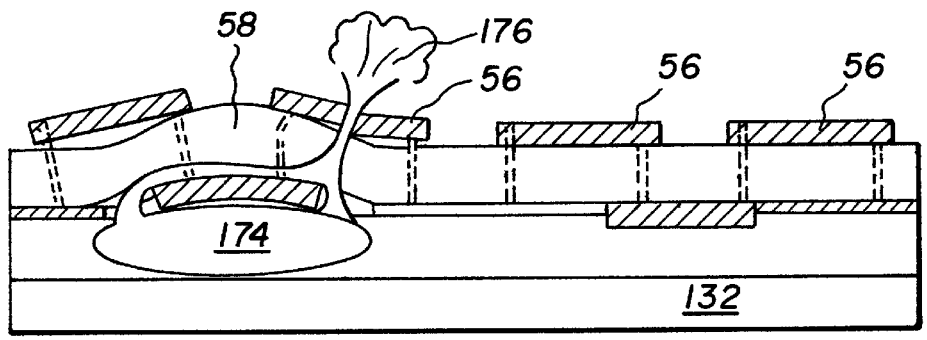
FIG. 22 is the cross section view of FIG. 21 illustrating the effect of placing the airship in a stratospheric environment.

The novel airship produced from the novel energy producing material provides numerous advantages over the prior art and is suitable for most applications in the troposphere and low stratosphere but is not constructed in accordance with the best mode of the invention for stratospheric and space and near space applications but is in accordance with the best mode for tropospheric application. In low stratospheric applications the best mode process of the invention contemplates the use of a gas pervious fabric or gas pervious flexible polymer substrate layer 170 for the structural layer 132. Referring now to FIGS. 21 and 22 a novel material with a gas impervious fabric or plastic substrate forming structural layer 132 is illustrated. In the bonding process a small bubble of air 172 is trapped between the bonded layers (FIG. 21) which on the ground or low troposphere does not present significant problems. However in the stratosphere air 172 expands to expanded volume 174 (FIG. 22) to many times its original volume to delaminate electrical layers and contacts or ruptures gore 58 at 176 as illustrated in FIG. 22.

Figure 23:
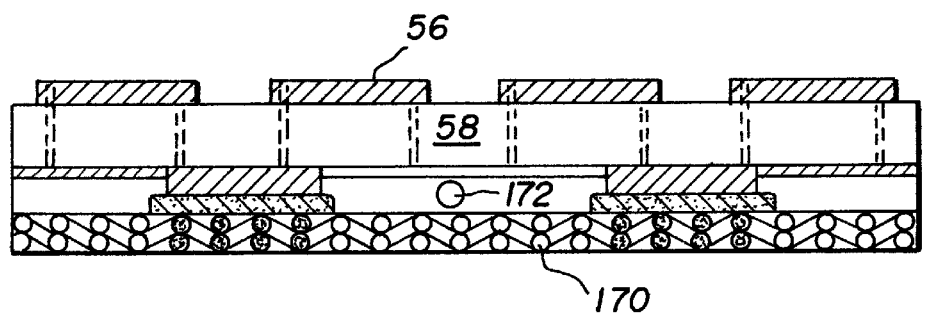
FIG. 23 is a cross section similar to FIG. 21 of an airship with a gas pervious substrate constructed in a process without a vacuum.
Figure 24:
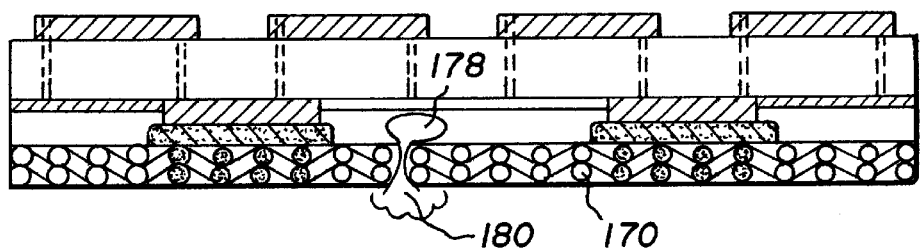
FIG. 24 is the cross section view of FIG. 23 illustrating the effect of placing the airship in a stratospheric environment.

In accordance with the best mode of the invention the problem of rupturing the gore can be obviated by employing a gas pervious layer or plastic or fabric 170 in the process as heretofore described or in modifying the novel process to join the structural layer 132 and layer 124 in the presence of a vacuum as will be hereinafter described. Referring now to FIGS. 23 and 24 the novel flexible energy producing material employs a gas pervious layer of plastic or fiber 170. In the bonding process the same small bubble of air 172 is trapped between the bonded layers (FIG. 23) which expands 178 in the stratosphere but due to the gas pervious layer of fabric or plastic substrate 170 is able to vent 180 into the lift gas in the airship without rupturing the protective covering, delaminating electrical connections, or breaking contact with the solar cells or rendering useless an array of solar cells.

Figure 18:
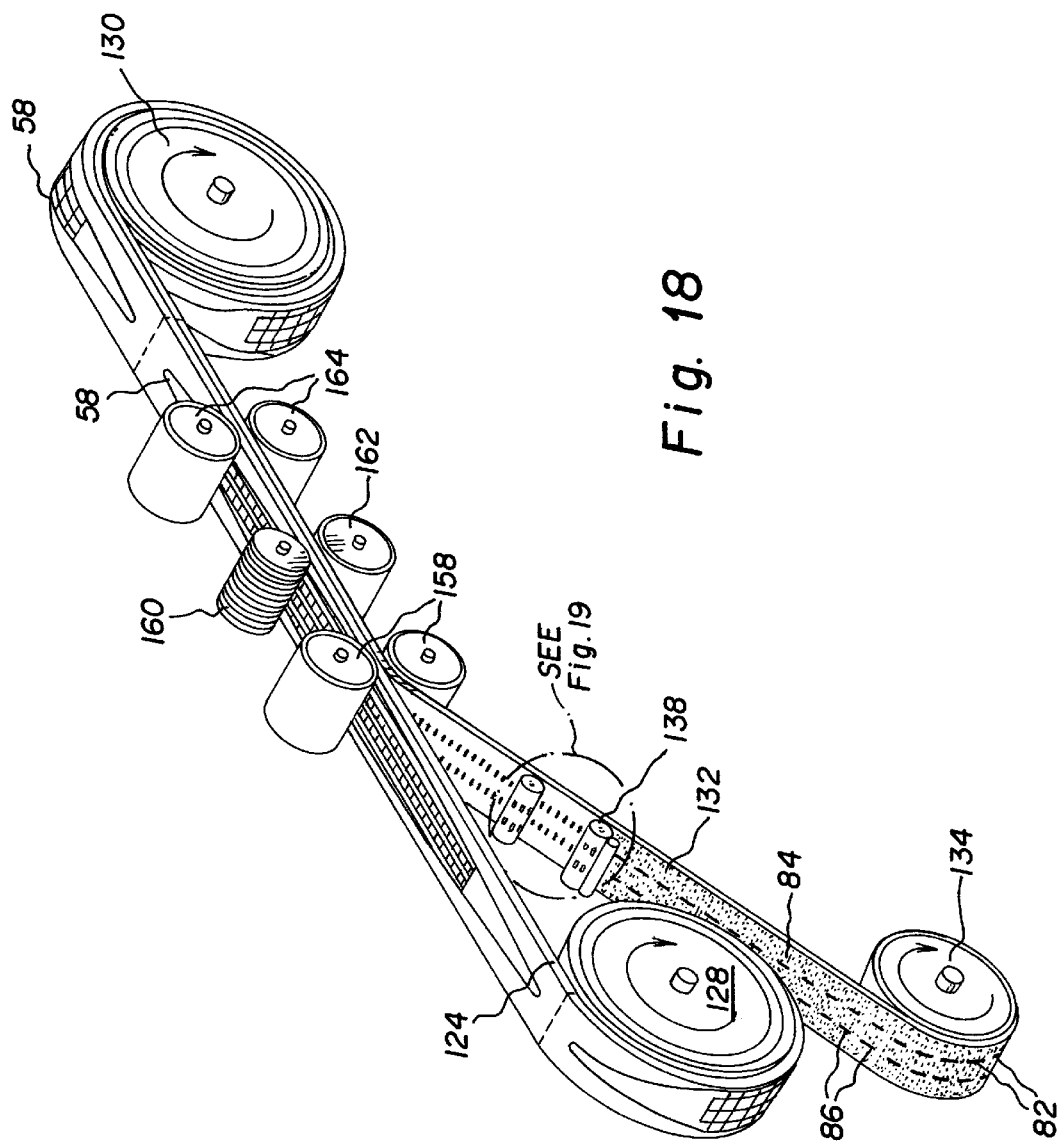
FIG. 18 is a perspective view of a process for producing the novel flexible energy producing covering of FIG. 17.
Figure 25:
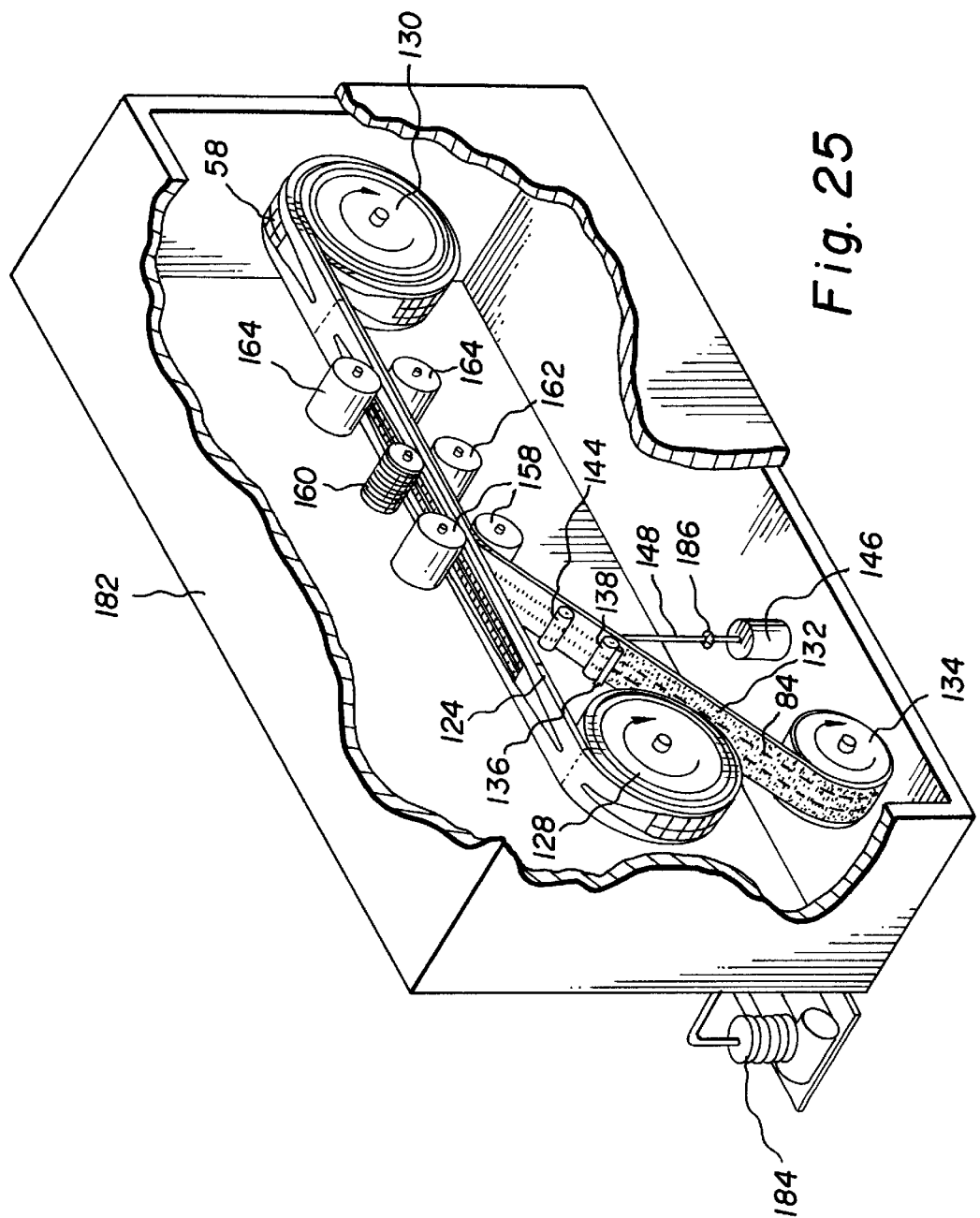
FIG. 25 is a perspective view similar to FIG. 18 but partly broken away illustrating an alternative process for preparing the novel energy producing covering in accordance with the invention.

Referring now to FIG. 25 the process in accordance with the best mode for preparing the novel energy producing covering is illustrated in which structural layer 132 and layer 124 are joined together in the presence of a vacuum to produce the novel stratospheric airship covering for applications in the stratosphere and at the threshold of space. The process described with respect to FIG. 18 is the same except all components of the novel energy producing fabric are joined together in the presence of a vacuum to prevent air from being trapped in any of the components of the novel energy producing material. In view of the size of the components a vacuum chamber 182 of about 20 to 30 feet (6 to 9 m) long and about 20 to 30 feet (6 to 9 m) wide and about 10 to 15 feet (3 to 4.6 m) high would be necessary to hold all components and processing equipment. The vacuum chamber 182 is connected to a vacuum pump 184 that is capable of evacuating vacuum chamber to about 34 to 8 Torr or to meet the specific stratospheric pressure application. All of the process steps and equipment as described with regard to FIG. 18 are repeated under vacuum except conductive adhesive container 146 is not under a positive pressure. Conductive adhesive container instead is at ambient pressure or slightly less and a valve 186 is provided in tube 148 to prevent excess conductive adhesive from being drawn from container 146.

Most of the materials required to construct the novel flexible energy producing material are readily available and known to those skilled in the art. Flexible solar cells are commercially available from a number of aerospace electronics companies such as TRW Space & Electronics Group, Redondo Beach, Calif.; Hughes Space and Communications Company, Los Angeles, Calif. or Iowa Thin Film Technologies, Ames Iowa. The flexible solar cells can be ordered in various shapes and sizes from the manufacturer with solar cell and electrical conductor patterns deposited on the substrate according to the customer's specifications. Substrate materials may also be obtained from various manufacturers in various sizes and fabric and polymer substrate films in accordance with customer specifications. Airship gore fabric and polymer film substrates typically will be about a half-mil (0.0005 inch or 13 micron) thick polyimide, polyester or polyvinyl fluoride film with the specified cell and electrical layer pattern repeated to match a gore blank's length on a roll of the plastic film.

Engineering fabrics are commercially available from such companies as Fabric Development, Inc., Quakertown, Pa.; Synthetic Industries—Performance Fabrics Division, Gainesville, Ga. or California Industrial Fabrics, Inc., San Diego, Calif. The polyester or aramid threads used for the electrically non-conductive threads are commercially available from E. I. Du Pont de Nemours & Company, Inc., Wilmington, Del. under the trade names Dacron® and Kevlar® respectively. In the best mode, the modified structural fabric with electrically conductive warp threads and electrically insulative weft threads will be woven to specifications and delivered on a roll with the conductive strip pattern repeated a gore's blank length apart to match the roll of the flexible solar cells.

The outer layer of the airship skin, with the cell and electrical layers deposited on it is bonded to the structural layer in a plastic film-laminating machine that may be obtained in a variety of sizes from Nordson Corporation, Duluth, Ga.; Mid-America Laminating, Inc.; Raytown, Mo. or Wesco Machine, Stow, Ohio. These machines use a gravure roller coating method for applying a uniformly thin coat of adhesive and then bring the layers together under controlled heat and mechanical force to insure a consistent, high quality lamination. The heat, time and mechanical force for this process vary with the materials and application but something like 400° F. (204° C.) at 20 psi (138 kPa) for two or three seconds is typical.

Those skilled in the art will recognize that many modifications can be made in the selection of flexible solar cell materials, flexible solar cell substrate materials, airship structural substrate materials as well as selection and utilization of different materials for layers of the envelope, types and numbers of heat reflective coatings for the flexible solar cells as well as the airship. These variations in the selection and application of materials are contemplated in the application of this invention to novel airship and novel energy producing gores to produce novel airships in accordance with the invention for use in the troposphere and stratosphere. These modifications as well as the selection of gas pervious fabric and polymer substrates may be made by those skilled in the art in view of the duration of the mission, purpose of the mission, length of the mission and other requirements of the high altitude platform of airship.

It will also be recognized by those skilled in the art that numerous modifications may be made to the novel processes for producing the novel flexible energy producing materials and that modifications to the novel processes may be made to suit particular requirements. The bonding processes can be accomplished in steps in attaching the conductive conduits to the solar cell layer and the airship substrate before the final bonding process depending upon the application of the invention, content of the lift gas, duration, mission and materials utilized. It will further be recognized the novel processes may be carried out at atmospheric pressure or vacuum depending upon the selection of substrate materials and the mission requirements of novel airships, airship gores and materials utilized in accordance with the invention.

Those skilled in the art will recognize that a wide variety of modifications may be made in the selection of conductive conduit materials and the arrangement and disposition of those materials between the solar cell substrate layer, electrically non-conductive adhesive and the flexible substrate. The conductive conduits can be varied in width, thickness and length and be incorporated in electrically non-conductive adhesive or electrically non-conductive threads in horizontal and vertical arrangements in accordance with the invention. These modifications may be made alone or together with the design of the novel airship gores and novel airships for application in the troposphere and stratosphere. These changes and modifications may be made to the thickness of the novel energy producing covering to reduce weight and provide long duration applications in the stratosphere and at the threshold of space.

As heretofore discussed the novel integrated solar cell skin may be modified in various ways by those skilled in the art in preparing flexible energy producing coverings and materials for a variety of applications and embodiments. It will be appreciated that these and other modifications can be made within the scope of the invention as defined in the following claims:

What is claimed is:

1. A vehicle having a flexible energy producing covering comprising:
    (a) a layer of flexible solar cells deposited on a flexible polymer film;
    (b) a gas pervious flexible fabric substrate;
    (c) a non-conductive flexible adhesive bonding said gas pervious flexible substrate to said flexible polymer film;
    (d) a first electrically conductive conduit disposed intermediate said flexible polymer film and said non-conductive flexible adhesive; and
    (e) a second electrically conductive conduit formed by a plurality of electrically conductive warp threads in said gas pervious flexible fabric substrate.

2. The vehicle of claim 1 wherein the weft threads of said gas pervious flexible fabric substrate are electrically non-conductive.

3. The vehicle of claim 1 wherein the airship energy producing covering is about 200 to 800 microns thick.

4. The vehicle of claim 3 wherein said plurality of warp threads are capable of carrying a voltage of from about 40 to 6,000 volts.

5. The vehicle of claim 1 wherein said airship energy producing covering is about 50 to 350 meters long and about 1 to 150 meters wide.

6. The vehicle of claim 2 wherein said first electrically conductive conduit is a conductive ribbon.

7. The vehicle of claim 6 wherein said conductive ribbon is disposed between said non-conductive flexible adhesive and said layer of flexible solar cells.

8. The vehicle of claim 6 wherein said conductive ribbon is from about 10 to 100 microns thick and from about 12 to 30 centimeters wide.

9. The vehicle of claim 8 wherein said conductive ribbon is disposed substantially along the entire length of said airship.

10. The vehicle of claim 8 wherein said conductive ribbon is a metallic conductive ribbon.

11. An energy producing gore for an airship comprising:
    (a) a layer of flexible solar cells deposited on a flexible polymer layer having a plurality of terminals extending through said flexible polymer layer, said flexible polymer layer forming the outer surface of an airship gore;
    (b) a flexible substrate forming the inner surface of said airship gore;
    (c) a non-conductive adhesive layer bonding said flexible substrate to said outer surface;
    (d) a first electrically conductive conduit disposed intermediate the back side of said layer of flexible solar cells and the back side of said flexible substrate wherein said plurality of terminals are simultaneously connected to said first electrically conductive conduit during the bonding of said flexible polymer layer to said flexible substrate; and
    (e) a second electrically conductive conduit disposed intermediate said flexible substrate and said layer of flexible solar cells.

12. The energy producing gore of claim 11 wherein said flexible substrate is gas pervious.

13. The energy producing gore of claim 11 wherein said flexible substrate is fabric and said first electrically conductive conduit is a plurality of first electrically conductive warp threads disposed substantially along the entire length of the gore.

14. The energy producing gore of claim 13 wherein the weft threads of said fabric are electrically non-conductive.

15. The energy producing gore of claim 14 wherein said second electrically conductive conduit is a second plurality of warp threads disposed adjacent to said plurality of first electrically conductive warp threads and electrically insulated from said first plurality of warp threads by said weft threads.

16. The energy producing gore of claim 13 wherein the gore is about 400 to 1,000 microns thick.

17. The energy producing gore of claim 16 wherein said gore is about 50 to 350 meters long and about 1 to 10 meters wide.

18. The energy producing gore of claim 14 wherein said second electrically conductive conduit is a conductive ribbon disposed between said fabric and said layer of flexible solar cells.

19. The energy producing gore of claim 18 wherein said conductive ribbon is disposed between said adhesive and said layer of flexible solar cells.

20. The energy producing gore of claim 18 wherein said conductive ribbon is from about 10 to 100 microns thick and from about 12 to 30 centimeters wide.

21. The energy producing gore of claim 20 wherein said conductive ribbon is disposed substantially along the entire length of the gore.

22. The energy producing gore of claim 20 wherein said conductive ribbon is a metallic conductive ribbon.

23. The energy producing gore of claim 11 wherein said flexible substrate is a polymer film.

24. The energy producing gore of claim 23 wherein said flexible substrate is gas pervious.

25. The energy producing gore of claim 24 wherein said first electrically conductive conduit and said second electrically conductive conduit is a first conductive ribbon and second conductive ribbon.

26. The energy producing gore of claim 25 wherein said first conductive ribbon and said second conductive ribbon are about 25 to 100 microns thick and about 12 to 30 centimeters wide.

27. The energy producing gore of claim 25 wherein said first conductive ribbon and said second conductive ribbon run substantially the entire length of the gore.

28. The energy producing gore of claim 27 wherein said first conductive ribbon and said second conductive ribbon are separated by said non-conductive flexible adhesive in different layers.

29. A high altitude flexible covering for converting solar energy to electrical energy comprising:
 (a) a flexible solar cell layer deposited on a polymer film;
 (b) a flexible substrate layer;
 (c) an electrically non-conductive flexible polymer adhesive bonding said flexible solar cell layer to said flexible substrate layer;
 (d) a first electrically conductive conduit disposed intermediate the back side of said flexible solar cell layer and the back side of said flexible substrate layer and connected to said flexible solar cell layer;
 (e) a plurality of first terminals extending through said polymer film connected to said first electrically conductive conduit;
 (f) a second electrically conductive conduit disposed intermediate the back side of said flexible solar cell layer and the back side of said flexible substrate layer and connected to said flexible solar cell layer; and
 (g) a plurality of second terminals extending through said polymer film connected to said second electrically conductive conduit.

30. The high altitude flexible covering of claim 29 wherein said flexible solar cell layer forms the outer surface of an airship gore.

31. The high altitude flexible covering of claim 30 wherein said flexible substrate layer is a fabric material.

32. The high altitude flexible covering of claim 31 wherein said first electrically conductive conduit is an electrically conductive warp thread in said fabric material.

33. The high altitude flexible covering of claim 32 wherein said warp thread extends substantially along the entire length of said airship gore.

34. The high altitude flexible covering of claim 33 wherein said fabric material includes electrically non-conductive weft threads.

35. The high altitude flexible covering of claim 34 wherein said second electrically conductive conduit extends substantially along the entire length of the airship gore.

36. The high altitude flexible covering of claim 35 wherein said second electrically conductive conduit is a metallic ribbon disposed between said electrically non-conductive flexible polymer adhesive and said flexible solar cell layer.

37. The high altitude flexible covering of claim 35 wherein said second electrically conductive conduit is a second electrically conductive warp thread in said fabric material.

38. The high altitude flexible covering of claim 32 wherein said flexible substrate layer is gas pervious.

39. The high altitude flexible covering of claim 29 wherein said flexible substrate layer is a plastic film.

40. The high altitude flexible covering of claim 32 wherein said first electrically conductive conduit and said second electrically conductive conduit extends substantially along the length of an airship gore.

41. The high altitude flexible covering of claim 40 wherein said first electrically conductive conduit and said second electrically conductive conduit are about 12 to 30 centimeters wide.

42. The high altitude flexible covering of claim 40 wherein said first electrically conductive conduit and said second electrically conductive conduit are electrically isolated by said electrically non-conductive flexible polymer adhesive.

43. The high altitude flexible covering of claim 29 wherein said first electrically conductive conduit and said second electrically conductive conduit are electrically isolated in different layers of said electrically non-conductive flexible polymer adhesive.

44. An energy producing flexible covering comprising:
 (a) a flexible solar cell deposited on a flexible polymer substrate forming an outer layer;
 (b) a flexible substrate;
 (c) a non-conductive adhesive bonding said outer layer to said flexible substrate;
 (d) a first electrically conductive conduit disposed intermediate said flexible solar cell and said flexible substrate and connected to said flexible solar cell;
 (e) a second electrically conductive conduit disposed intermediate the back side of said outer layer and the back side of said flexible substrate; and
 (f) a plurality of terminals extending through said flexible polymer substrate connected to said second electrically conductive conduit wherein the connection of said plurality of terminals to said second electrically conductive conduit are made when said outer layer is bonded to said flexible substrate with said non-conductive adhesive.

45. The energy producing flexible covering of claim 44 wherein said flexible substrate is a fabric material.

46. The energy producing flexible covering of claim 45 wherein said second electrically conductive conduit is an electrically conductive thread woven in said fabric material.

47. The energy producing flexible covering of claim 46 wherein said second electrically conductive conduit is a second electrically conductive thread woven in said fabric material.

48. The energy producing flexible covering of claim 47 further comprising a solar cell protective covering.

49. The energy producing flexible covering of claim 46 wherein said first electrically conductive conduit is a metallic ribbon.

50. The energy producing flexible covering of claim 49 wherein said metallic ribbon includes an electrically conductive fibrous-like surface.

51. The energy producing flexible covering of claim 49 wherein said metallic ribbon is disposed intermediate said flexible solar cell and said fabric material.

52. The energy producing flexible covering of claim 51 wherein said metallic ribbon is disposed on the upper surface of said non-conductive adhesive.

53. The energy producing flexible covering of claim 51 wherein said non-conductive adhesive includes a plurality of openings.

54. The energy producing flexible covering of claim 53 further comprising an electrically conductive material disposed in said plurality of openings to connect said flexible solar cell with said conductive thread.

55. The energy producing flexible covering of claim 53 wherein said electrically conductive material is a conductive adhesive.

56. The energy producing flexible covering of claim 51 further comprising an electrically conductive material disposed in said plurality of openings to connect said flexible solar cell with said metallic ribbon and to connect said flexible solar cell with said first conductive thread.

57. The energy producing flexible covering of claim 44 wherein said flexible substrate is a plastic material.

58. The energy producing flexible covering of claim 57 wherein said first conductive conduit is a metallic ribbon.

59. The energy producing flexible covering of claim 58 wherein said second conductive conduit is a second metallic ribbon.

60. The energy producing flexible covering of claim 59 wherein said metallic ribbon is disposed intermediate said flexible solar cell and said non-conductive adhesive.

61. The energy producing flexible covering of claim 60 wherein said second conductive conduit is disposed intermediate said non-conductive adhesive and said flexible substrate.

62. The energy producing flexible covering of claim 44 wherein said non-conductive adhesive includes a plurality of openings.

63. The energy producing flexible covering of claim 62 further comprising an electrically conductive material in said plurality of openings for connecting said flexible solar cell to said second metallic ribbon.

64. The energy producing flexible covering of claim 44 wherein said non-conductive adhesive is a polymer adhesive selected from the group of adhesives consisting of acrylic, silicone, polyurethane and mixtures thereof.

65. A vehicle having a flexible energy producing covering comprising:
  (a) a flexible polymer layer;
  (b) a layer of flexible solar cells deposited on said flexible polymer layer;
  (c) a plurality of terminals extending through said flexible polymer layer;
  (d) a flexible substrate;
  (e) a non-conductive flexible layer bonding said flexible substrate to said flexible polymer layer;
  (f) a first electrically conductive conduit disposed intermediate the bottom surface of said flexible substrate and the bottom surface of said flexible polymer layer wherein said plurality of terminals extending through said flexible layer are connected to said first electrically conductive conduit as said flexible polymer layer is bonded to said flexible substrate; and
  (g) a second electrically conductive conduit disposed intermediate the bottom surface of said flexible substrate and the bottom surface of said flexible polymer layer.

66. The vehicle of claim 65 wherein said flexible substrate is gas impervious.

67. The vehicle of claim 65 wherein said flexible substrate is gas pervious.

68. The vehicle of claim 67 wherein said flexible substrate is a fabric substrate of an airship and said first electrically conductive conduit is a plurality of electrically conductive warp threads disposed substantially along the entire length of said airship.

69. The vehicle of claim 68 wherein the weft threads of said fabric substrate are electrically non-conductive.

70. The vehicle of claim 69 wherein said second electrically conductive conduit is a second plurality of warp threads disposed adjacent to said plurality of electrically conductive warp threads and electrically insulated from said second plurality of warp threads by said weft threads.

71. The vehicle of claim 66 wherein said flexible substrate is a polymer film.

72. The vehicle of claim 67 wherein said flexible substrate is a polymer film.

73. The vehicle of claim 72 wherein said first electrically conductive conduit and said second electrically conductive conduit are a first conductive ribbon and a second conductive ribbon.

74. The vehicle of claim 73 wherein said first conductive ribbon and said second conductive ribbon are about 10 to 100 microns thick and about 12 to 30 centimeters wide.

75. The vehicle of claim 73 wherein said first conductive ribbon and said second conductive ribbon run substantially the entire length of said airship.

76. The vehicle of claim 75 wherein said first conductive ribbon and said second conductive ribbon are separated by said non-conductive flexible adhesive in different layers.

77. The vehicle of claim 75 wherein said first conductive ribbon and said second conductive ribbon are capable of carrying from about 40 to 6,000 volts.

78. A flexible energy producing covering comprising:
  (a) a flexible solar cell layer deposited on a flexible polymer film in an orientation conforming to the desired electrical properties of the covering;
  (b) a flexible substrate layer;
  (c) a non-conductive layer bonding said flexible solar cell layer to said flexible substrate layer;

(d) a first electrically conductive conduit disposed intermediate the bottom side of said flexible solar cell layer and the back side of said flexible substrate layer and connected to said flexible solar cell layer by solar cell terminals extending through said polymer film; and (e) a second electrically conductive conduit disposed intermediate the bottom side of said flexible solar cell layer and the back side of said flexible substrate layer and connected to said flexible solar cell layer by solar cell terminals extending through said polymer film.

79. The flexible energy producing covering of claim 78 wherein said flexible substrate layer is a fabric material.

80. The flexible energy producing covering of claim 78 wherein said first electrically conductive conduit is an electrically conductive thread woven in said fabric material.

81. The flexible energy producing covering of claim 79 wherein said second electrically conductive conduit is a flexible conductive ribbon disposed intermediate the bottom side of said flexible solar cell layer and the top side of said non-conductive layer.

82. The flexible energy producing covering of claim 79 wherein said second electrically conductive conduit is a second electrically conductive thread woven in said fabric material.

83. The flexible energy producing covering of claim 79 wherein said second electrically conductive conduit is an electrically conductive fibrous-like substance disposed intermediate said fabric and said non-conductive layer.

84. The flexible energy producing covering of claim 78 wherein said flexible substrate layer is a flexible polymer layer.

85. The flexible energy producing covering of claim 78 wherein said first electrically conductive conduit and said second conductive conduit is a first electrically conductive ribbon and a second electrically conductive ribbon.

86. The flexible energy producing covering of claim 85 wherein said first electrically conductive ribbon and said second electrically conductive ribbon are disposed intermediate said non-conductive layer and said flexible polymer layer.

87. The flexible energy producing covering of claim 85 wherein said first electrically conductive ribbon is disposed intermediate the bottom side of said flexible solar cell layer and said non-conductive layer and said second electrically conductive ribbon is disposed intermediate said non-conductive layer and said flexible polymer layer.

* * * * *